US012531607B2

(12) United States Patent
Duan et al.

(10) Patent No.: US 12,531,607 B2
(45) Date of Patent: Jan. 20, 2026

(54) SEMI-OPEN-LOOP MIMO TRANSMISSION BASED ON TYPE-II PRECODING MATRICES

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/391,507

(22) Filed: Dec. 20, 2023

(65) Prior Publication Data

US 2025/0211294 A1 Jun. 26, 2025

(51) Int. Cl.
*H04L 5/12* (2006.01)
*H04B 7/0456* (2017.01)
*H04B 7/06* (2006.01)
*H04L 5/00* (2006.01)
*H04W 72/1273* (2023.01)

(52) U.S. Cl.
CPC ......... *H04B 7/0456* (2013.01); *H04B 7/0626* (2013.01); *H04L 5/0048* (2013.01); *H04W 72/1273* (2013.01)

(58) Field of Classification Search
CPC ... H04B 7/0456; H04B 7/0626; H04L 5/0048; H04W 72/1273

USPC ........................................................ 375/262
See application file for complete search history.

(56) References Cited

U.S. PATENT DOCUMENTS 8,428,018 B2 * 4/2013 Noh ...................... H04B 7/0617
370/467
10,763,925 B2 9/2020 Onggosanusi et al.
2021/0242988 A1 8/2021 Kwak et al.

OTHER PUBLICATIONS

International Search Report and Written Opinion—PCT/US2024/058442—ISA/EPO—Feb. 24, 2025.

* cited by examiner

*Primary Examiner* — Helene E Tayong
(74) *Attorney, Agent, or Firm* — Procopio, Cory, Hargreaves & Savitch LLP

(57) ABSTRACT

Aspects presented herein may improve multiple-input multiple-output (MIMO) operations by providing a semi-open-loop MIMO scheme with a higher granularity. In one aspect, a network entity formulates, based on wideband (WB) channel state information of a channel from a user equipment (UE), a set of precoding matrices to be applied on a set of resource blocks (RBs) or a set of resource elements (REs) for a data channel transmission on the channel. The network entity precodes the set of RBs or the set of REs for the data channel transmission on the channel with the formulated set of precoding matrices and a set of phase values in a cycling manner. The network entity transmits, via the channel, an indication of the set of precoded RBs or the set of precoded REs.

28 Claims, 13 Drawing Sheets

| Rank 1 payload (bits) | | | | | | | |
|---|---|---|---|---|---|---|---|
| L (*) | Rotation: [$\log_2(O_1,O_2)$] | L-beam selection (**) | Strongest coefficient (1 out of 2L): Rotation: [$\log_2 2L$] per layer | WB amp: $3 \times (2L-1)$ per layer | Total WB payload | SB amp (1 SB): $1 \times (K-1)$ per layer | SB phase (1 SB): $Z \times (K-1) + 2 \times (2L-K)$ per layer | Total payload (WB + 18 SBs) |
| 2 | 2 [/4] | 3 | 2 | 9 | 16 [/18] | 3 | 9 | 232 [/234] |
| 3 | 2 [/4] | 2 | 3 | 15 | 22 [/24] | 3 | 13 | 310 [/312] |
| 4 | 2 [/4] | 0 | 3 | 21 | 26 [/28] | 5 | 19 | 458 [/460] |
| Rank 2 payload (bits) | | | | | | | | |
| 2 | 2 [/4] | 3 | 4 | 18 | 27 [/29] | 6 | 18 | 459 [/461] |
| 3 | 2 [/4] | 2 | 6 | 30 | 40 [/42] | 6 | 26 | 616 [/618] |
| 4 | 2 [/4] | 0 | 6 | 42 | 50 [/52] | 10 | 38 | 914 [/916] |

FIG. 5

| Rank 1 payload (bits) | | | | | | | |
|---|---|---|---|---|---|---|---|
| L (*) | Rotation: $[\log_2(O_1, O_2)]$ | L-beam selection | Strongest coefficient (1 out of 2L): $[\log_2 2L]$ per layer | Pole amp ratio $(P_{l,p}^{(1)})$ | FD basis selection | Amp $3(K^2-v)$ | Phase $4(K'-v)$ | Position of Amp/Phase | Total payload |
| 2 | 2 [/4] | 3 | 2 | 4 | 4+7 | ~12 | ~16 | 20 | 68 |
| 3 | 2 [/4] | 2 | 3 | 4 | 4+7 | ~21 | ~28 | 30 | 99 |
| 4 | 2 [/4] | 0 | 3 | 4 | 4+7 | ~27 | ~36 | 40 | 121 |
| Rank 2 payload (bits) | | | | | | | | | |
| 2 | 2 [/4] | 3 | 4 | 8 | 8+14 | ~24 | ~32 | 40 | 133 |
| 3 | 2 [/4] | 2 | 6 | 8 | 8+14 | ~42 | ~56 | 60 | 196 |
| 4 | 2 [/4] | 0 | 6 | 8 | 8+14 | ~54 | ~72 | 80 | 242 |

FIG. 6

SEMI-OPEN-LOOP MIMO TRANSMISSION BASED ON TYPE-II PRECODING MATRICES

TECHNICAL FIELD

The present disclosure relates generally to communication systems, and more particularly, to wireless communication involving precoding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus formulates, based on wideband (WB) channel state information of a channel from a user equipment (UE), a set of precoding matrices to be applied on a set of resource blocks (RBs) or a set of resource elements (REs) for a data channel transmission on the channel. The apparatus precodes the set of RBs or the set of REs for the data channel transmission on the channel with the formulated set of precoding matrices and a set of phase values in a cycling manner. The apparatus transmits, via the channel, an indication of the set of precoded RBs or the set of precoded REs.

In an aspect of the disclosure, a method, a computer-readable medium, and an apparatus are provided. The apparatus transmits, to a network entity, wideband (WB) channel state information of a channel. The apparatus receives, from the network entity based on the WB channel state information, an indication of at least one of a set of precoding matrices or a set of phase values to be applied to a set of precoded resource blocks (RBs) or a set of precoded resource elements (REs) for a data channel transmission with a cycling manner. The apparatus demodulates the set of precoded RBs or the set of precoded REs based on at least one of the set of precoding matrices or the set of phase values.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example precoding matrix indicator (PMI) payload size for Type-II codebook.

FIG. 6 is a diagram illustrating an example PMI payload size for enhanced Type-II codebook (eType-II) codebook.

DETAILED DESCRIPTION

Figure 1:
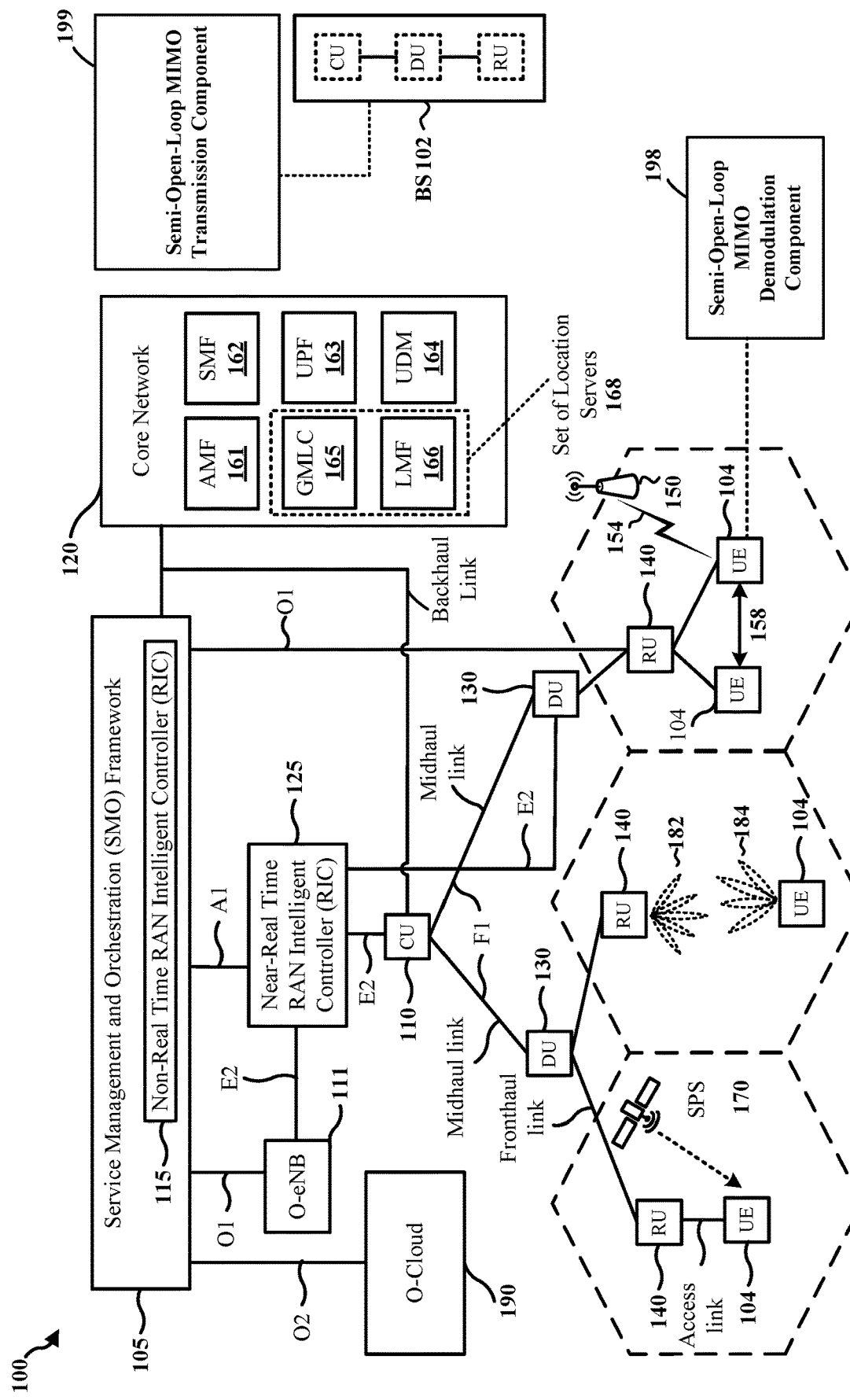
FIG. 1 is a diagram illustrating an example of a wireless communications system and an access network.

Aspects presented herein may improve multiple-input multiple-output (MIMO) operations by providing a semiopen-loop MIMO scheme with a higher granularity (e.g., with resource element (RE)/resource block (RB)-level) non-transparent precoder cycling based on (e)Type-II codebook while enabling the same demodulation reference signal demodulation reference signal (DMRS) bundling size to be maintained.

Aspects presented herein provide an open-loop transmit diversity scheme, where DMRS is bundled over a physical resource group (PRG), but the data REs/RBs in the PRG are separately precoded with a known precoding vectors with regards to the DMRS. This is a mixed scheme with receiver transparent precoder cycling (over PRGs), and non-transparent open loop precoding within PRG.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a semi-open-loop MIMO demodulation component 198 that may be configured to transmit, to a network entity, WB channel state information of a channel; receive, from the network entity based on the WB channel state information, an indication of at least one of a set of precoding matrices or a set of phase values to be applied to a set of precoded RBs or a set of precoded REs for a data channel transmission with a cycling manner; and demodulate the set of precoded RBs or the set of precoded REs based on at least one of the set of precoding matrices or the set of phase values. In certain aspects, the base station 102 may have a semi-open-loop MIMO transmission component 199 that may be configured to formulate, based on WB channel state information of a channel from a UE, a set of precoding matrices to be applied on a set of RBs or a set of REs for a data channel transmission on the channel; precode the set of RBs or the set of REs for the data channel transmission on the channel with the formulated set of precoding matrices and a set of phase values in a cycling manner; and transmit, via the channel, an indication of the set of precoded RBs or the set of precoded REs.

Figure 2:
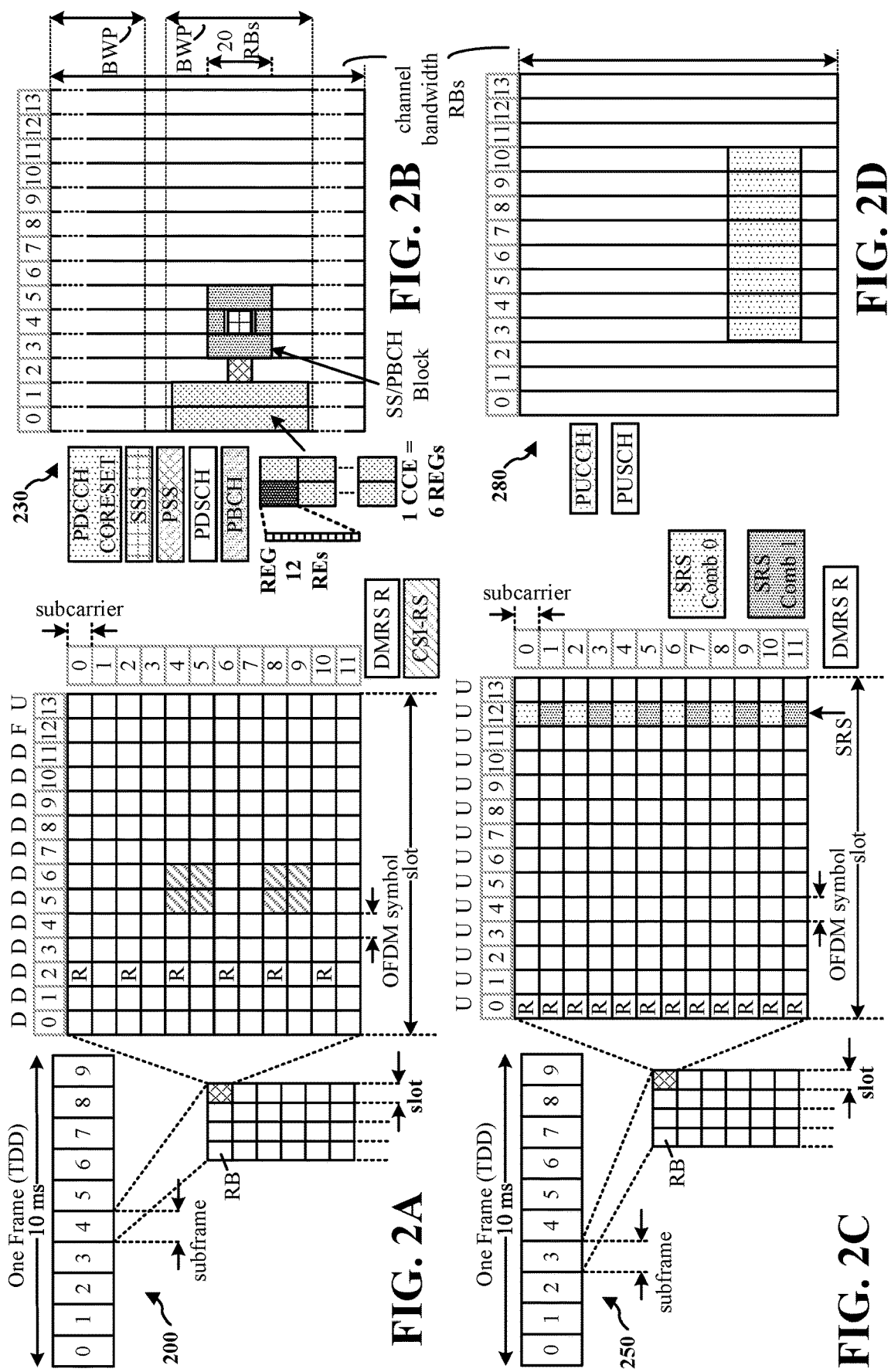
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^y \cdot 15$ kHz, where y is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
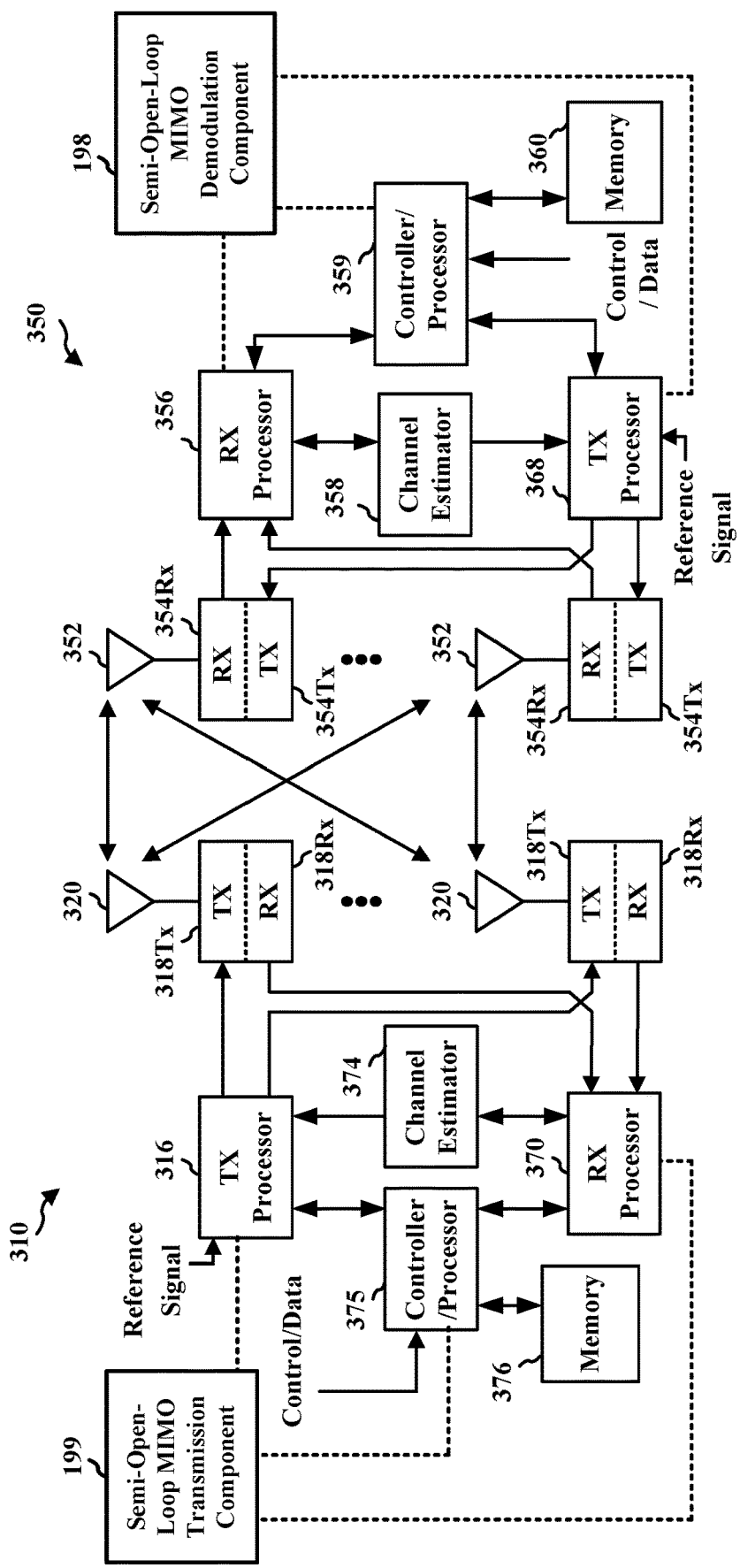
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the semi-open-loop MIMO demodulation component 198 of FIG. 1.

At least one of the TX processor 316, the RX processor 370, and the controller/processor 375 may be configured to perform aspects in connection with the semi-open-loop MIMO transmission component 199 of FIG. 1.

Multiple-input multiple-output (MIMO) may refer to a technology used in wireless communication systems to improve the performance and capacity of wireless channels/links. For example, MIMO may enable multiple antennas to be used at both the transmitter and the receiver to transmit and receive multiple data streams simultaneously. As such, MIMO may leverage the spatial diversity and multipath propagation characteristics of the wireless channel to enhance communication reliability and throughput. For example, MIMO systems may take the advantage of the property that signals take multiple paths to reach the receiver due to reflections and scattering in the environment (which may be referred to as the "multipath"). By using multiple antennas, the receiver may combine these different paths to improve signal quality and reduce the effects of fading and interference. MIMO systems may also increase data throughput by transmitting multiple independent data streams simultaneously, where each data stream may be transmitted on a different antenna, and the receiver may separate and decode these streams to increase the overall data rate. In addition, MIMO systems may also enable beamforming techniques to focus the transmitted signal energy in a specific direction, improving the link quality and extending the coverage area.

Depending on implementations, MIMO may include closed-loop MIMO and open-loop MIMO, which provide two different operating modes or configurations for MIMO systems in wireless communication. They may differ in how the system adapts to the changing wireless channel conditions and how feedback is used to optimize performance. For example, the closed-loop MIMO may include a feedback mechanism that provides channel state information (CSI) from a receiver back to a transmitter. The receiver may measure the characteristics of the wireless channel, such as signal-to-noise ratio (SNR), fading, interference, and other parameters. This channel information is then reported back to the transmitter, allowing the transmitter to adapt/modify its transmission parameters/settings based on the current channel conditions. On other hand, the open-loop MIMO does not include a feedback mechanism. In other words, a receiver does feedback to the transmitter regarding the channel conditions. Instead, the transmitter may use a predefined transmission scheme without knowledge of the actual channel conditions.

Figure 4:
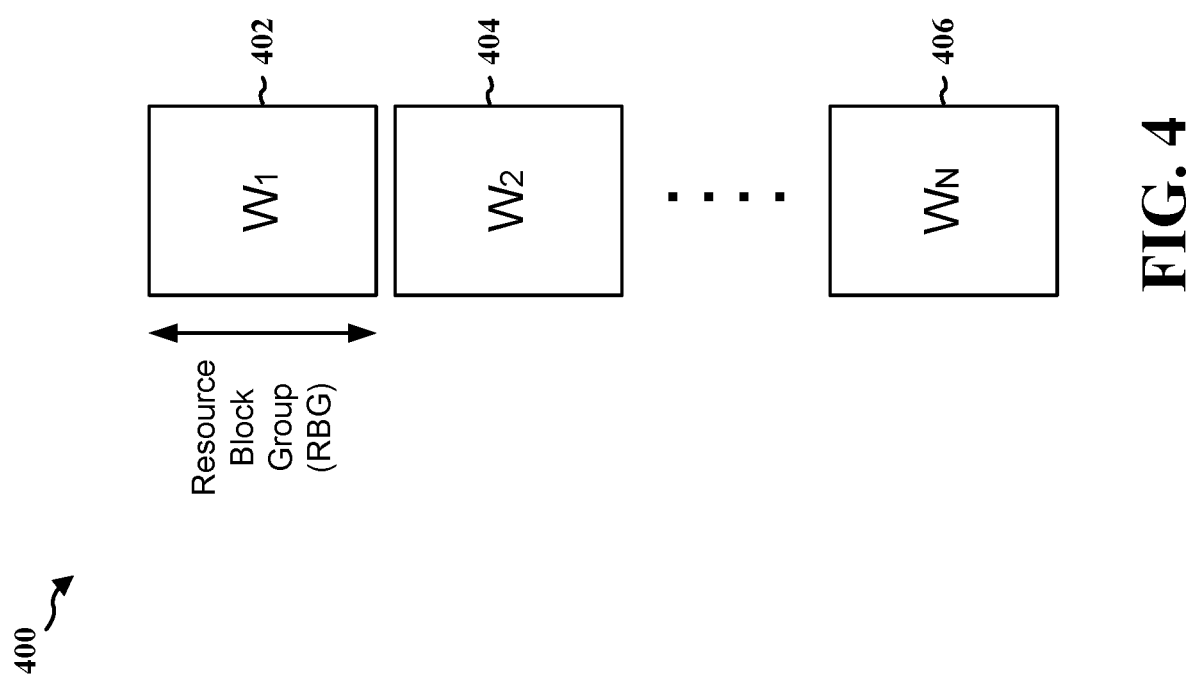
FIG. 4 is a diagram illustrating an example of open-loop multiple-input multiple-output (MIMO) in accordance with various aspects of present disclosure.

FIG. 4 is a diagram 400 illustrating an example of open-loop multiple-input multiple-output (MIMO) in accordance with various aspects of present disclosure. Certain network implementations, such as 5G new radio (NR), may support resource block group (RBG)-level precoder cycling (PC) for open-loop MIMO, where a transmitter may transmit resource blocks (RBs) in groups based on a cycling manner, and apply a different precoder to each group of RBs (e.g., to each RBG). For example, as shown at 402, a transmitter may apply a first precoder ($W_1$) to a first RBG (e.g., to a first group of RBs), apply a second precoder ($W_2$) to a second RBG (e.g., to a second group of RBs) as shown at 404, and apply an $N^{th}$ precoder ($W_N$) to an $N^{th}$ RBG (e.g., to an $N^{th}$ group of RBs) as shown at 406, etc.

Under the open-loop MIMO, a receiver (e.g., a UE) may be allocated/configured with the frequency resources for receiving the RBGs, which may be referred to as "RBG bundling." In other words, RBG bundling may refer to a strategy in which multiple RBs are grouped together (e.g., as RBGs) or bundled to improve the performance of an open-loop MIMO system. RBG bundling may be an approach to optimize open-loop MIMO systems for specific scenarios and network conditions. It may help balance the trade-off between the benefits of open-loop MIMO (lower feedback overhead, simplicity) and the drawbacks (limited adaptability to channel variations).

In some examples, the frequency resource(s) that can be allocated to a receiver (e.g., a UE) for the open-loop MIMO may be specified to have: (1) a minimum number of 24 RBs (e.g., Min # of RBs=24), (2) a maximum number of 275 RBs (e.g., Max # of RBs=275), (3) a physical resource block (PRB) size may be 2, 4, or wideband (e.g., PRB bundling size={2, 4, wideband}), and (4) a number of physical resource groups (PRGs) as defined by Table 2 below. For purposes of the present disclosure, a PRG just mean a group of RB that uses the same precoder, whereas an RBG may refer to a group of consecutive virtual RBs.

TABLE 2

Example Number of PRGs Supported by NR Open-Loop MIMO

| Bundling size | Min # of PRGs | Max # of PRGs |
|---|---|---|
| 2 | 12 | 138 |
| 4 | 8 | 69 |
| Wideband | 1 | 1 |

A receiver (e.g., a UE) may not be aware of the configuration(s)/parameter(s) associated with the precoder cycling for open-loop MIMO applied by a transmitter (e.g., a network entity, a base station, a component of the base station, etc.). In other words, certain configuration(s)/parameter(s) associated with precoder cycling for the open-loop MIMO may be transparent to the receiver (which may be referred to as "transparent precoder cycling"). However, the receiver may be configured to know at least the cycling size.

One disadvantage associated with the transparent precoder cycling (e.g., an open-loop MIMO with precoder cycling) is that a large number of PRGs may be specified to achieve the full cycling. For example, if the number of beams per polarization (POL) is 4 (e.g., # of beams per POL=4) (e.g., {120° coverage with 30° half-power beam width (HPBW)}, {60° coverage with 15° HPBW}, or {30° coverage with 7.5° HPBW}, etc.) and the number of cross-polarization (XPOL) co-phasing is also 4 (e.g., XPOL Co-phasing=4), then a total of 16 PRGs may be specified for one cycling. In addition, large bundling size may specify a huge amount of RBs for the cycling while small bundling size may degrade channel estimation (CE) performance. As such, there may be a tradeoff between diversity gain and CE performance for the transparent precoder cycling.

Under the closed-loop MIMO, a transmitter and a receiver may be configured to apply a set of codebooks, which may include a set of vectors and matrices. A transmitter (e.g., the network) may dynamically change the MIMO precoding matrix based on the channel state information (CSI) report from a receiver (e.g., a UE) in order to achieve high precoding gain, lower feedback overhead and/or flexibility to support various antenna configurations and different numbers of data streams.

An example codebook structure (e.g., a closed-loop MIMO based Type-I codebook) for rank-1 and rank 2 may be represented based on the followings:

x=u⊗v (x: specific beam; u, v: DFT vector)

Precoding matrix with rank-1 ($W^{(1)}$) may be represented by:

$$W^{(1)} = \begin{bmatrix} x \\ \varphi x \end{bmatrix}$$

$$\varphi \in \{+1, -1, +j, -j\}$$

Precoding matrix with rank-2 ($W^{(2)}$) may be represented by:

$$W^{(2)} = \begin{bmatrix} x & x' \\ \varphi x & -\varphi x' \end{bmatrix}$$

$$x = x' \text{ or } x^H x' = 0$$

$$\varphi \in \{+1, +j,\}$$

The first column of each precoding matrix above may be constructed assuming that a transmitter (e.g., a base station, a gNB, etc.) has XPOL uniform linear array (ULA)/uniform rectangular array (URA) antennas. The second column may be designed partially assuming the other POL than the first creates the second rank (e.g., the same beam with orthogonal structure). The other cases/columns may be manually designed to force the unitary property.

A receiver (e.g., a UE) may be configured to determine and provide a precoding matrix indicator (PMI) to a transmitter, which may be referred to as a PMI feedback. In one example, under a first mode of PMI feedback (Mode-1 (i1, i2)), the receiver may be configured to select a beam (u, v) in wideband (WB) for i1, and select a co-phasing value in WB or sub-band (SB) for i2. Under a second mode of PMI feedback (Mode-2 (i1, i2)), the receiver may be configured to select a group of 4 adjacent beams in WB for i1, and select a beam within the group and a co-phasing value in WB or SB for i2. The receiver may determine the PMI based on:

$$(R^*, i_1^*, i_2^*)_s = \underset{r, i_1, i_2}{\arg\max} \, SE_{est}(H_s, W^{(r)}(i_1, i_2))$$

where the receiver may apply a brute force search, a sequential basis search from the first rank to the r-th rank, and/or find singular value decomposition (SVD) precoding matrix (V) (e.g., for a given rank of V, find the code point to minimize the distance between V and W).

In another example, the codebook structure (e.g., a closed-loop MIMO based Type-II codebook) for rank R may be represented based on the followings:

$x_l=u_a \otimes v_b$ (x: specific beam l; u, v: DFT vector)

Precoding matrix with rank-R ($W^{(R)}$) may be represented by:

$$W^{(R)} = \frac{1}{\sqrt{R}} [w^{(1)}, \ldots, w^{(R)}]$$

$$w^{(r)} = \frac{1}{\sqrt{M_{Tx} \sum_{l=0}^{2L-1} |\alpha_l|^2}} \begin{bmatrix} \sum_{i=0}^{L-1} \alpha_i^{(r)} x_i \\ \sum_{i=0}^{L-1} \alpha_{i+L}^{(r)} x_i \end{bmatrix}$$

Each column may be designed assuming that a transmitter (e.g., a base station, a gNB) has XPOL ULA (URA) and the channel is composed of L dominant clusters (e.g., each cluster may correspond to one beam), where L∈ {2, 3, 4} for Type-II and L∈ {2, 4, 6} for enhanced Type-II codebook (eType-II). The same set of L beams ($x_l$, l=0, . . . , L−1) may be applied for the both POL and the all layers. In one example, eType-II codebook may apply frequency-domain compression of sub-band $\alpha_l^{(r)}$ values based on DFT basis, while Type-II codebook does not apply a compression. In addition, the precoding matrix is not forced/specified to be unitary.

In one example, for the Type-II codebook PMI feedback, a receiver (e.g., a UE) may be configured to select L orthogonal beams (e.g., applying the same offset value) within $O_1O_2N_1N_2$ beam set, the strongest SD vector, and WB amplitudes for i1, and indicate SB phases (e.g., phase values may be within four-phase-shift keying (4PSK) or eight-phase-shift keying (8PSK) and SB amplitudes (if configured) for i2. On the other hand, for the eType-II codebook PMI feedback, the receiver may be configured to select L orthogonal beams (e.g., applying the same offset value) within $O_1O_2N_1N_2$ beam set, $M_v$ FD basis, and the strongest FD vector for i1, and indicate indicates the compressed coefficients of SB phases and SB amplitudes for i2.

FIG. 5 is a diagram 500 illustrating an example PMI payload size for Type-II codebook. When ($N_1$, $N_2$, P)=(4, 1, 2)/(2, 2, 2), the maximum number of sub-bands for a CSI reporting may be up to 18, where K=4, 4, 6 for L=2, 3, 4, respectively, and Z=3 (e.g., for 8PSK). As illustrated by the diagram 500, the largest portion of a PMI feedback overhead may come from the sub-band (SB) reporting.

FIG. 6 is a diagram 600 illustrating an example PMI payload size for eType-II codebook. When ($N_1$, $N_2$, P)=(4, 1, 2)/(2, 2, 2), the maximum number of sub-bands for a CSI reporting may be up to 18, where K=4, 4, 6 for L=2, 3, 4, respectively, and Z=3 (e.g., for 8PSK) (e.g., [R=2, $p_v$=¼→Mv=5], [beta=¼→$K_0$=5, 8, 10]). As illustrated by the diagram 600, even with the frequency domain (FD) compression, more than hundred bits are specified for PMI reporting.

In general, closed-loop MIMO based on Type-II codebook and eType-II codebook (collectively as "(e)Type-II codebook" hereafter) may achieve a significant performance gain compared to Type-I codebook and open-loop MIMO schemes. However, closed-loop MIMO performance may be subject to the channel state feedback (CSF) delay which may come from channel measurement report (CMR) delay, and also receiver (e.g., UE) CSF processing time and feedback resource scheduling delay, etc. In addition, as shown by FIGS. 5 and 6, (e)Type-II PMI may specify a large CSF payload size mainly due to the sub-band PMI information, which may result in a longer delay of CSF processing time. On the other hand, although open-loop MIMO may be a solution to reduce the feedback overhead (e.g., without specifying a feedback), as described in connection with FIG. 4, PRG-level precoder cycling may specify a large number of RB allocations to a receiver (e.g., a UE). As discussed above, small(er) RB bundling size may also degrade the channel estimation performance.

Aspects presented herein may improve MIMO operations by providing a semi-open-loop MIMO scheme with a higher granularity (e.g., with resource element (RE)/resource block (RB)-level) non-transparent precoder cycling based on (e)Type-II codebook while enabling the same demodulation reference signal DMRS bundling size to be maintained.

For example, in one aspect of the present disclosure, for a rank-1 (e.g., r=1) semi open-loop MIMO, a transmitter may be configured to apply the following precoding matrix ($w^{(r)}$) to data resource:

$$w^{(r)} = \frac{1}{\sqrt{M_t \sum_{l=0}^{2L-1} |\alpha_l|^2}} \begin{bmatrix} \sum_{l=0}^{L-1} \alpha_l^{(1)} x_l \\ \sum_{l=0}^{L-1} \alpha_{l+L}^{(1)} x_l \end{bmatrix}$$

Then, a receiver (e.g., a UE) may be configured to provide just the WB information associated with a channel, such as the spatial domain (SD) basis (e.g., L vectors, $x_i$), the strongest vector, and the amplitude values ($|\alpha_l^{(1)}|$). However, the receiver is not configured/specified to provide the SB information, where the transmitter may be configured to apply the phase values (e.g., $\angle\alpha_l^{(1)}$) in a cycling matter. For example, the number of phase combination may be $4^{2L-1}$ for 4PSK phase and $8^{2L-1}$ for 8PSK phase. If restricting L=2, 64 resources for 4PSK or 512 resources for 8PSK are specified for one cycle. As such, the semi-open-loop MIMO scheme described herein may enable a receiver to not report/skip reporting SB information (which typically occupies the largest portion of the reporting overhead) while providing/ maintaining significant performance gain without degrading channel estimation performance.

In addition, DMRS structure associated with the semi-open-loop MIMO scheme described herein may specify just 2L DMRS ports (i.e., L=number of beams), where each port may be precoded with $x_i$ and transmitted on each POL. For example, in the case of two beams (e.g., L=2), a transmitter (e.g., a base station) may transmit on port 1 with $x_0$ on positive polarization (+POL), port 2 with $x_0$ on negative polarization (−POL), port 3 with $x_1$ on +POL, and port 4 with $x_1$ on −POL, etc. Note the semi-open-loop MIMO scheme described herein may apply to any rank (e.g., rank>2). However, for ease of illustration, examples below are described with rank-1 scenarios.

Figure 7:
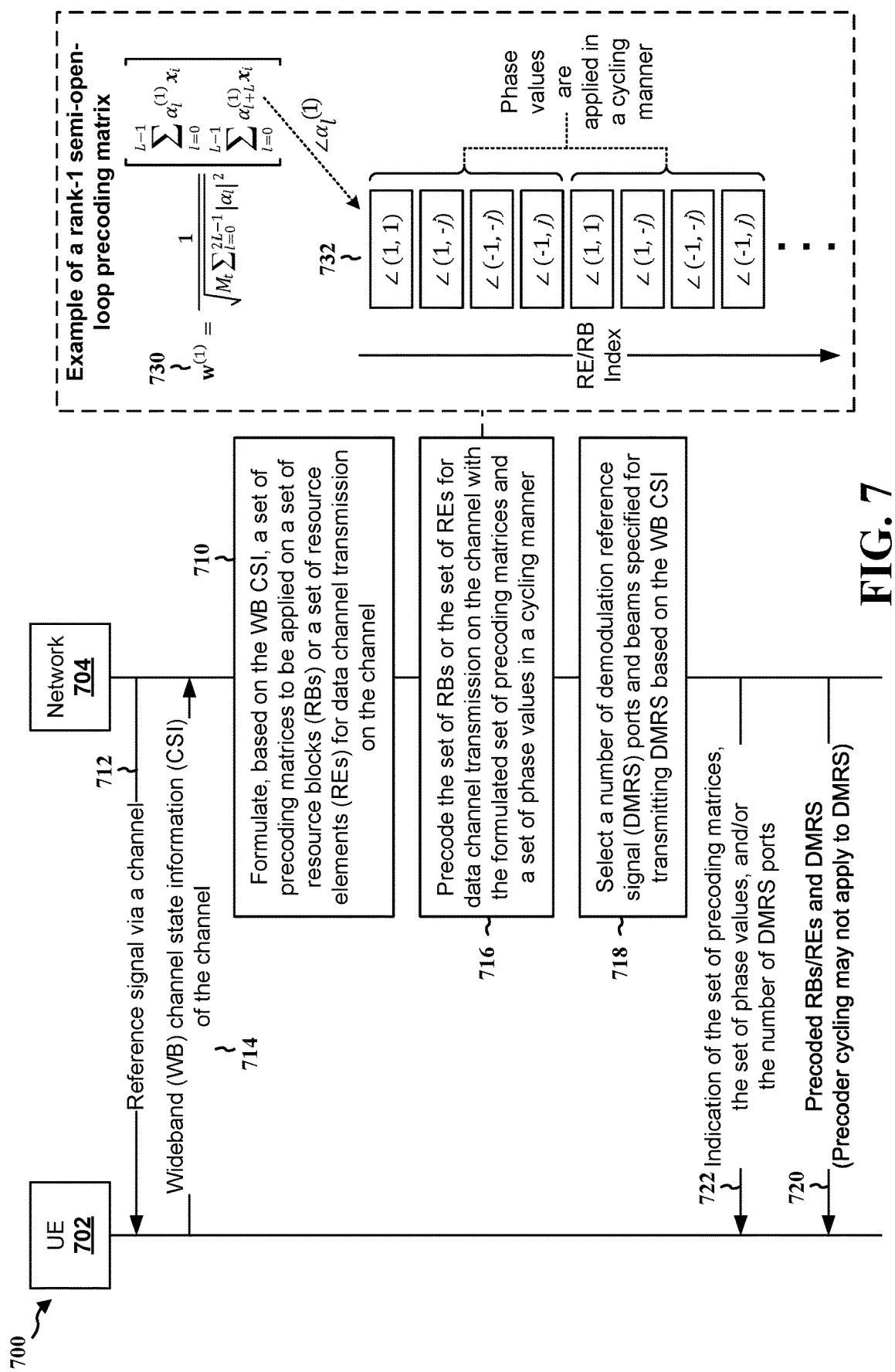
FIG. 7 is a communication flow illustrating an example of applying a semi-open-loop precoding matrix in accordance with various aspects of the present disclosure.

FIG. 7 is a communication flow 700 illustrating an example of applying a semi-open-loop precoding matrix in accordance with various aspects of the present disclosure. The numberings associated with the communication flow 700 do not specify a particular temporal order and are merely used as references for the communication flow 700. Aspects presented herein may enable a network entity (e.g., a base station, a component of the base station, etc.) to transmit on a data channel (which may be referred to as a "data channel transmission") using a set of precoding matrices without specifying SB information. As such, reporting overhead may be significantly reduced for a UE while maintaining the channel estimation performance. For purposes of the present disclosure, a wideband (WB) or a WB channel may refer to the full bandwidth of a channel, whereas a sub-band (SB) or a SB channel may refer to small(er) portion(s) of the full bandwidth of the channel. Thus, WB channel state information (CSI) may refer to CSI of the full bandwidth channel, and SB CSI may refer to CSI of a portion of the full bandwidth channel.

At 710, a network entity 704 (e.g., a base station, a component of a base station, a gNB, a component of the gNB, etc.) may be configured to formulate a set of precoding matrices to be applied on a set of resource blocks (RBs) or a set of resource elements (REs) (collectively as "set of REs/RBs") for data channel transmission on a channel (e.g., a data channel, a WB channel, etc.), where the formulation of the set of precoding matrices may be based on WB CSI provided by a UE 702. The set of REs/RBs for data channel transmission may be associated with a physical downlink shared channel (PDSCH) transmission.

In one example, for the network entity 704 to obtain the WB CSI from the UE 702, as shown at 712, the network entity 704 may be configured to transmit a set of reference signals (RSs) to the UE 702 via the channel. Then, as shown at 714, the UE 702 may receive and measure the set of RSs, generate the corresponding WB CSI for the channel, and transmit the generated WB CSI to the network entity 704. The WB CSI may include a set of beams selected by the UE 702 (e.g., L vectors, $x_i$), a strongest beam, and a set of amplitude values ($|\alpha_l^{(r)}|$) for the set of selected beams, etc. In addition, the network entity 704 may not be specified to obtain SB CSI from the UE 702 in formulating the set of precoding matrices (e.g., network entity 704 may just specify the WB CSI information to reduce the signaling overhead).

In one aspect, the set of precoding matrices ($w^{(r)}$) may be associated with the Type-II codebook and/or the enhanced Type-II codebook (eType-II codebook) (collectively as "(e) Type-II codebook), which may be represented with:

$$w^{(r)} = \frac{1}{\sqrt{M_{Tx} \sum_{l=0}^{2L-1} |\alpha_l|^2}} \begin{bmatrix} \sum_{l=0}^{L-1} \alpha_l^{(r)} x_l \\ \sum_{l=0}^{L-1} \alpha_{l+L}^{(r)} x_l \end{bmatrix}$$

where $w^{(r)}$ is a precoding matrix with rank-r, r is the rank, L is the number of vectors (e.g., beams), $x_i$ refers to a specific beam i, and a may indicate a coefficient of a beam ($|\alpha|$ may indicate an amplitude value).

At 716, the network entity 704 may precode the set of RBs or the set of REs for data channel transmission on the channel with the formulated set of precoding matrices ($w^{(r)}$) and a set of phase values ($\angle\alpha_l^{(r)}$) in a cycling manner. For example, as shown at 730, assuming the precoding matrix to be applied (to the set of REs/RBs) is a rank-1 precoding matrix (e.g., r=1), the precoding matrix may be represented as:

$$w^{(1)} = \frac{1}{\sqrt{M_t \sum_{l=0}^{2L-1} |\alpha_l|^2}} \begin{bmatrix} \sum_{l=0}^{L-1} \alpha_l^{(1)} x_l \\ \sum_{l=0}^{L-1} \alpha_{l+L}^{(1)} x_l \end{bmatrix}$$

Then, as shown at 732, the network entity 704 may apply, to the set of REs/RBs, the precoding matrix with a set of phase values ($\angle\alpha_l^{(1)}$) in a cycling manner. For example, if the phase is associated with 4PSK, there may be four different phase values, e.g., $\angle(1, 1)$, $\angle(1, -j)$, $\angle(-1, -j)$, and $\angle(-1, j)$. Then, to apply the precoding matrix with difference phase values to the set of REs/RBs in a cycling manner, the network entity 704 may apply the precoding matrix with a first phase value ∠(1, 1) to a first subset of REs/RBs in the set of REs/RBs (e.g., to one or more REs/RBs in the set of REs/RBs), apply the precoding matrix with a second phase value ∠(1, −j) to a second subset of REs/RBs in the set of REs/RBs, apply the precoding matrix with a third phase value ∠(−1, −j) to a third subset of REs/RBs in the set of REs/RBs, apply the precoding matrix with a fourth phase value ∠(−1, j) to a fourth subset of REs/RBs in the set of REs/RBs, apply the precoding matrix with the first phase value ∠(1, 1) to a fifth subset of REs/RBs in the set of REs/RBs, and so on. Thus, each precoding matrix in the set of precoding matrices may be associated with a different phase value in the set of phase values. In some examples, the number of phase combination may be $4^{2L-1}$ for 4PSK phase and $82^{L-1}$ for 8PSK phase.

At 718, the network entity 704 may also select (and determine) the number of demodulation reference signal (DMRS) ports and beams specified for transmitting DMRS, which may be selected/determined based on the WB CSI and/or the set of precoding matrices to be applied. For example, the network entity 704 may specify 2L DMRS ports to be used for transmitting DMRS, where each DMRS port is precoded with $x_i$, and the network entity 704 may transmit on each POL with a given bundling size. For example, in a case where L=2, the network entity 704 may transmit on port 0 with $x_0$ on +POL, port 1 with $x_0$ on −POL, port 2 with $x_1$ on +POL, and port 3 with $x_1$ on −POL, etc.

At 720, the network entity 704 may transmit (or transmit an indication of) the precoded set of RBs/REs and a set of DMRS based on the selected DMRS ports. Note the precoder cycling (e.g., apply precoding in the cycling manner) may not apply to the transmission of DMRS.

After the UE 702 receives the precoded set of RBs/REs (and the set of DMRS), the UE 702 may be configured to demodulate and decode the precoded set of RBs/REs based on the precoding matrix applied to the set of RBs/REs and based on the number of DMRS ports used by the network entity 704 for transmitting the DMRS. For example, the UE 702 may be configured to determine/calculate the precoded channel by applying the (e)type-II precoding matrix:

$$Hw^{(r)} = \frac{1}{\sqrt{M_t \sum_{l=0}^{2L-1} |\alpha_l|^2}} \begin{bmatrix} \sum_{l=0}^{L-1} \alpha_l^{(1)} H_+ x_i \\ \sum_{l=0}^{L-1} \alpha_{l+L}^{(1)} H_- x_i \end{bmatrix}$$

where the UE 702 may be configured to measure the component channel $H_+ x_i$ on the first POL on DMRS port 2i, and measure the component channel $H\_x_i$ on the second POL on DMRS port 2i+1, etc. Then, the UE 702 may perform demodulation based on the calculated (e)Type-II precoded channel. In some implementations, the UE 702 may also be configured to transmit an indication of the demodulated set of precoded RBs/REs based on at least one of the set of precoding matrices or the set of phase values.

In some implementations, as the UE 702 may be specified to know the set of precoding matrices applied by the network entity 704, the phase values applied by the network entity 704, and/or the number of DMRS ports used by the network entity 704, at 722, the network entity 704 may transmit, to the UE 702, an indication of the set of precoding matrices, the set of phase values, and/or the number of DMRS ports.

In other implementations, some of these parameters (e.g., the precoding matrices used, the phase values, and/or the number of DMRS ports) may be (pre-)configured for the UE 702 or defined in a specification (e.g., without specifying additional signaling).

Aspects presented herein provide an open-loop transmit diversity scheme, where DMRS is bundled over a physical resource group (PRG), but the data REs/RBs in the PRG are separately precoded with a known precoding vectors with regards to the DMRS. This is a mixed scheme with receiver transparent precoder cycling (over PRGs), and non-transparent open loop precoding within PRG.

Figure 8:
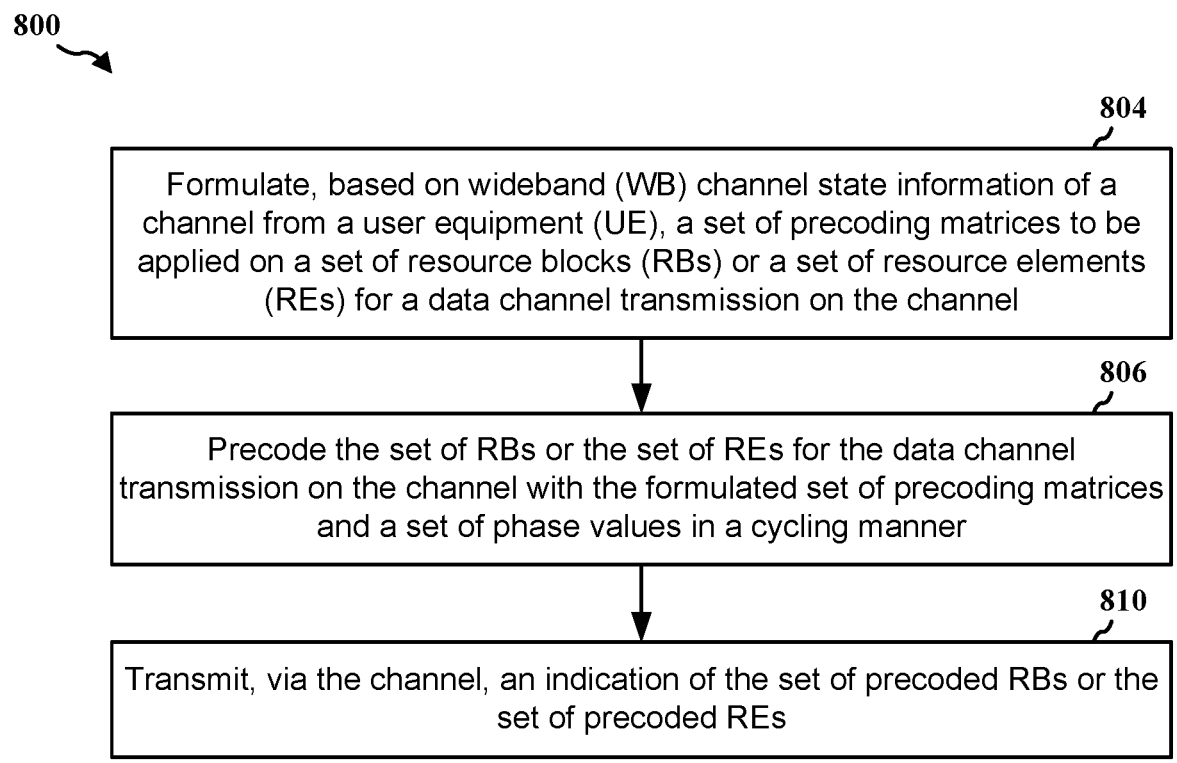
FIG. 8 is a flowchart of a method of wireless communication.

FIG. 8 is a flowchart 800 of a method of wireless communication. The method may be performed by a base station (e.g., the base station 102; the network entity 704, 1002). The method may enable the base station to perform MIMO operations based on a semi-open-loop MIMO scheme with a higher granularity.

At 804, the base station may formulate, based on WB channel state information of a channel from a UE, a set of precoding matrices to be applied on a set of RBs or a set of REs for a data channel transmission on the channel, such as described in connection with FIG. 7. For example, at 710, the network entity 704 (e.g., a base station, a component of a base station, a gNB, a component of the gNB, etc.) may be configured to formulate a set of precoding matrices to be applied on a set of RBs or a set of REs (collectively as "set of REs/RBs") for data channel transmission on a channel (e.g., a data channel, a WB channel, etc.), where the formulation of the set of precoding matrices may be based on WB CSI provided by the UE 702. The formulation of the set of precoding matrices may be performed by, e.g., the semi-open-loop MIMO transmission component 199, the RU processor(s) 1042, and/or the transceiver(s) 1046 of the network entity 1002 in FIG. 10.

In one example, the WB channel state information includes at least one of a set of selected beams, a strongest selected beam, or a set of amplitude values for the set of selected beams.

At 806, the base station may precode the set of RBs or the set of REs for the data channel transmission on the channel with the formulated set of precoding matrices and a set of phase values in a cycling manner, such as described in connection with FIG. 7. For example, at 716, the network entity 704 may precode the set of RBs or the set of REs for data channel transmission on the channel with the formulated set of precoding matrices ($w^{(r)}$) and a set of phase values ($\angle\alpha_l^{(r)}$) in a cycling manner. The precoding of the set of RBs or the set of REs may be performed by, e.g., the semi-open-loop MIMO transmission component 199, the RU processor(s) 1042, and/or the transceiver(s) 1046 of the network entity 1002 in FIG. 10.

At 810, the base station may transmit, via the channel, an indication of the set of precoded RBs or the set of precoded REs, such as described in connection with FIG. 7. For example, at 720, the network entity 704 may transmit (or transmit an indication of) the precoded set of RBs/REs. The transmission of the indication may be performed by, e.g., the semi-open-loop MIMO transmission component 199, the RU processor(s) 1042, and/or the transceiver(s) 1046 of the network entity 1002 in FIG. 10.

In one example, the base station may transmit, for the UE, a set of reference signals via the channel without precoding, and receive, from the UE, the WB channel state information of the channel, such as described in connection with FIG. 7. For example, for the network entity 704 to obtain the WB CSI from the UE 702, as shown at 712, the network entity

704 may be configured to transmit a set of RSs to the UE 702 via the channel. Then, as shown at 714, the UE 702 may receive and measure the set of RSs, generate the corresponding WB CSI for the channel, and transmit the generated WB CSI to the network entity 704. The transmission of the set of reference signals and/or the reception of the WB channel state information may be performed by, e.g., the semi-open-loop MIMO transmission component 199, the RU processor(s) 1042, and/or the transceiver(s) 1046 of the network entity 1002 in FIG. 10.

In another example, the base station may transmit, for the UE, an indication of the formulated set of precoding matrices or the set of phase values, such as described in connection with FIG. 7. For example, at 722, the network entity 704 may transmit, to the UE 702, an indication of the set of precoding matrices, the set of phase values, and/or the number of DMRS ports. The transmission of the indication may be performed by, e.g., the semi-open-loop MIMO transmission component 199, the RU processor(s) 1042, and/or the transceiver(s) 1046 of the network entity 1002 in FIG. 10.

In another example, the base station may select a number of DMRS ports and beams for a transmission of a DMRS based on the WB channel state information, and transmit, via the channel, the DMRS based on the selected number of DMRS ports and beams without precoder cycling, such as described in connection with FIG. 7. For example, at 718, the network entity 704 may also select (and determine) the number of DMRS ports specified for transmitting DMRS, which may be selected/determined based on the WB CSI and/or the set of precoding matrices to be applied. At 720, the network entity 704 may transmit (or transmit an indication of) a set of DMRS based on the selected DMRS ports. The selection of the number of DMRS ports and/or the transmission of the DMRS may be performed by, e.g., the semi-open-loop MIMO transmission component 199, the RU processor(s) 1042, and/or the transceiver(s) 1046 of the network entity 1002 in FIG. 10. In some implementations, to select the number of DMRS ports for the transmission of the DMRS based on the WB channel state information, the base station may associate the WB channel state information with the transmission of the DMRS, and select the number of DMRS ports for the transmission of the DMRS based on the association of the WB channel state information with the transmission of the DMRS.

In another example, each precoding matrix in the set of precoding matrices may be associated with a different phase value in the set of phase values.

In another example, each precoding matrix in the set of precoding matrices may be applied to one or more RBs in the set of RBs or to one or more REs in the set of REs for the data channel transmission.

In another example, the set of RBs or the set of REs for the data channel transmission may be associated with a PDSCH.

In another example, the set of precoding matrices may be associated with at least one of a Type-II codebook or an enhanced Type-II codebook (eType-II codebook).

Figure 9:
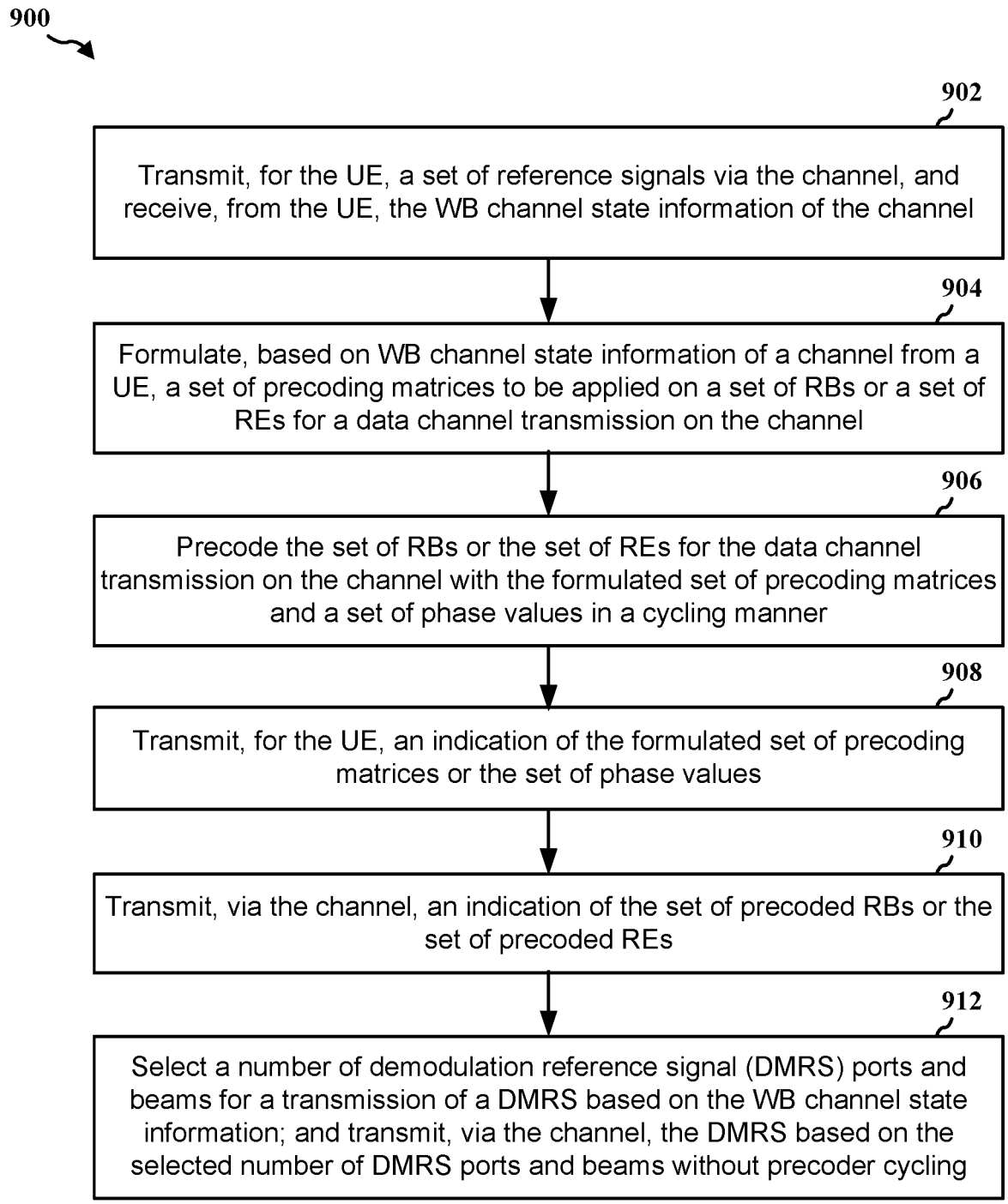
FIG. 9 is a flowchart of a method of wireless communication.

FIG. 9 is a flowchart 900 of a method of wireless communication. The method may be performed by a base station (e.g., the base station 102; the network entity 704, 1002). The method may enable the base station to perform MIMO operations based on a semi-open-loop MIMO scheme with a higher granularity.

At 904, the base station may formulate, based on WB channel state information of a channel from a UE, a set of precoding matrices to be applied on a set of RBs or a set of REs for a data channel transmission on the channel, such as described in connection with FIG. 7. For example, at 710, the network entity 704 (e.g., a base station, a component of a base station, a gNB, a component of the gNB, etc.) may be configured to formulate a set of precoding matrices to be applied on a set of RBs or a set of REs (collectively as "set of REs/RBs") for data channel transmission on a channel (e.g., a data channel, a WB channel, etc.), where the formulation of the set of precoding matrices may be based on WB CSI provided by the UE 702. The formulation of the set of precoding matrices may be performed by, e.g., the semi-open-loop MIMO transmission component 199, the RU processor(s) 1042, and/or the transceiver(s) 1046 of the network entity 1002 in FIG. 10.

In one example, the WB channel state information includes at least one of a set of selected beams, a strongest selected beam, or a set of amplitude values for the set of selected beams.

At 906, the base station may precode the set of RBs or the set of REs for the data channel transmission on the channel with the formulated set of precoding matrices and a set of phase values in a cycling manner, such as described in connection with FIG. 7. For example, at 716, the network entity 704 may precode the set of RBs or the set of REs for data channel transmission on the channel with the formulated set of precoding matrices ($w^{(r)}$) and a set of phase values ($\angle \alpha_i^{(r)}$) in a cycling manner. The precoding of the set of RBs or the set of REs may be performed by, e.g., the semi-open-loop MIMO transmission component 199, the RU processor(s) 1042, and/or the transceiver(s) 1046 of the network entity 1002 in FIG. 10.

At 910, the base station may transmit, via the channel, an indication of the set of precoded RBs or the set of precoded REs, such as described in connection with FIG. 7. For example, at 720, the network entity 704 may transmit (or transmit an indication of) the precoded set of RBs/REs. The transmission of the indication may be performed by, e.g., the semi-open-loop MIMO transmission component 199, the RU processor(s) 1042, and/or the transceiver(s) 1046 of the network entity 1002 in FIG. 10.

In one example, as shown at 902, the base station may transmit, for the UE, a set of reference signals via the channel, and receive, from the UE, the WB channel state information of the channel, such as described in connection with FIG. 7. For example, for the network entity 704 to obtain the WB CSI from the UE 702, as shown at 712, the network entity 704 may be configured to transmit a set of RSs to the UE 702 via the channel. Then, as shown at 714, the UE 702 may receive and measure the set of RSs, generate the corresponding WB CSI for the channel, and transmit the generated WB CSI to the network entity 704. The transmission of the set of reference signals and/or the reception of the WB channel state information may be performed by, e.g., the semi-open-loop MIMO transmission component 199, the RU processor(s) 1042, and/or the transceiver(s) 1046 of the network entity 1002 in FIG. 10.

In another example, as shown at 908, the base station may transmit, for the UE, an indication of the formulated set of precoding matrices or the set of phase values, such as described in connection with FIG. 7. For example, at 722, the network entity 704 may transmit, to the UE 702, an indication of the set of precoding matrices, the set of phase values, and/or the number of DMRS ports. The transmission of the indication may be performed by, e.g., the semi-open-loop MIMO transmission component 199, the RU processor(s) 1042, and/or the transceiver(s) 1046 of the network entity 1002 in FIG. 10.

In another example, as shown at 912, the base station may select a number of DMRS ports and beams for a transmission of a DMRS based on the WB channel state information, and transmit, via the channel, the DMRS based on the selected number of DMRS ports and beams without precoder cycling, such as described in connection with FIG. 7. For example, at 718, the network entity 704 may also select (and determine) the number of DMRS ports specified for transmitting DMRS, which may be selected/determined based on the WB CSI and/or the set of precoding matrices to be applied. At 720, the network entity 704 may transmit (or transmit an indication of) a set of DMRS based on the selected DMRS ports. The selection of the number of DMRS ports and/or the transmission of the DMRS may be performed by, e.g., the semi-open-loop MIMO transmission component 199, the RU processor(s) 1042, and/or the transceiver(s) 1046 of the network entity 1002 in FIG. 10. In some implementations, to select the number of DMRS ports for the transmission of the DMRS based on the WB channel state information, the base station may associate the WB channel state information with the transmission of the DMRS, and select the number of DMRS ports for the transmission of the DMRS based on the association of the WB channel state information with the transmission of the DMRS.

In another example, each precoding matrix in the set of precoding matrices may be associated with a different phase value in the set of phase values.

In another example, each precoding matrix in the set of precoding matrices may be applied to one or more RBs in the set of RBs or to one or more REs in the set of REs for the data channel transmission.

In another example, the set of RBs or the set of REs for the data channel transmission may be associated with a PDSCH.

In another example, the set of precoding matrices may be associated with at least one of a Type-II codebook or an enhanced Type-II codebook (eType-II codebook).

Figure 10:
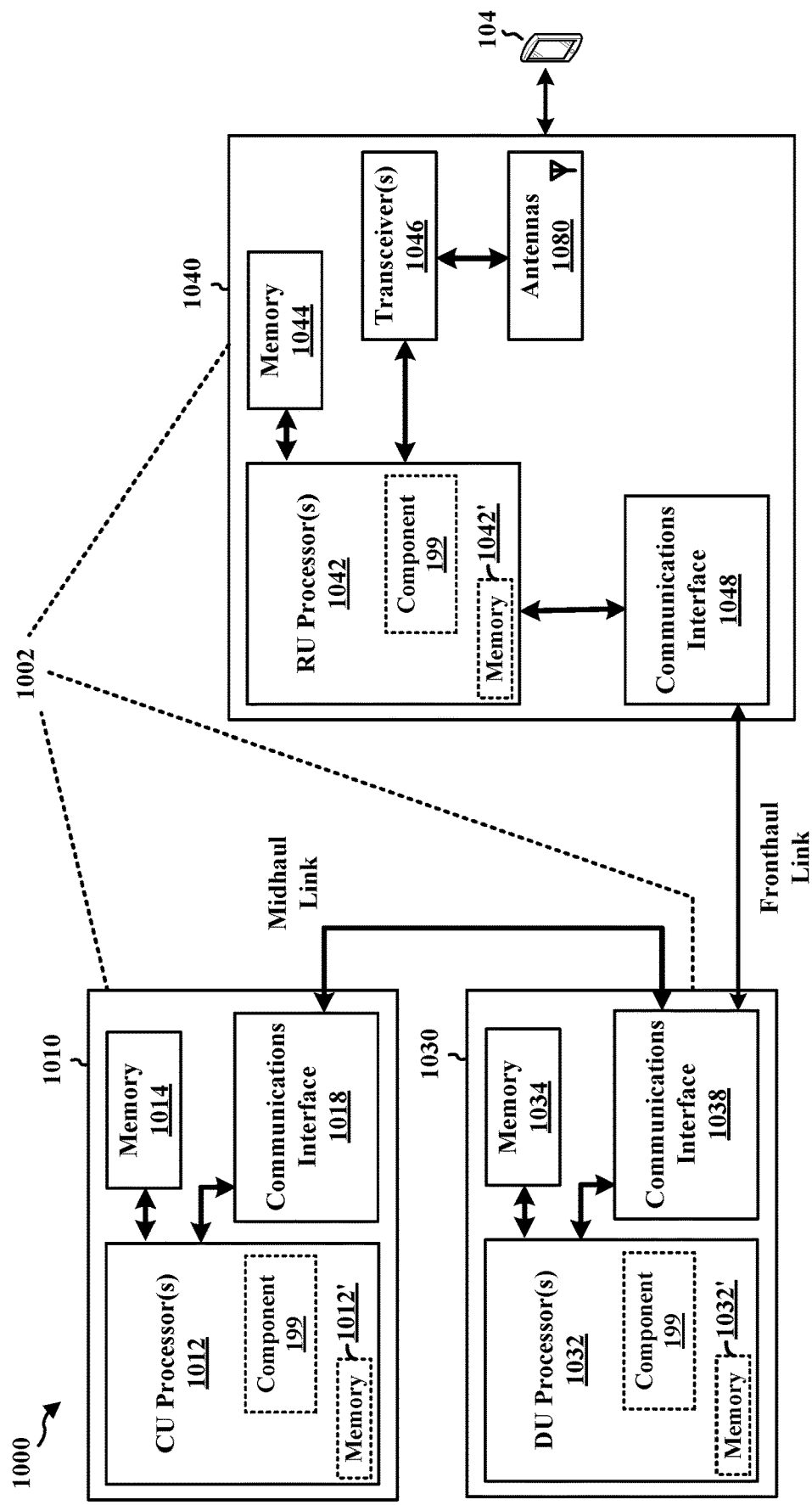
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the semi-open-loop MIMO transmission component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include at least one CU processor 1012. The CU processor(s) 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include at least one DU processor 1032. The DU processor(s) 1032 may include on-chip memory 1032'. In some aspects, the DU 1030 may further include additional memory modules 1034 and a communications interface 1038. The DU 1030 communicates with the RU 1040 through a fronthaul link. The RU 1040 may include at least one RU processor 1042. The RU processor(s) 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the semi-open-loop MIMO transmission component 199 may be configured to formulate, based on WB channel state information of a channel from a UE, a set of precoding matrices to be applied on a set of RBs or a set of REs for a data channel transmission on the channel. The semi-open-loop MIMO transmission component 199 may also be configured to precode the set of RBs or the set of REs for the data channel transmission on the channel with the formulated set of precoding matrices and a set of phase values in a cycling manner. The semi-open-loop MIMO transmission component 199 may also be configured to transmit, via the channel, an indication of the set of precoded RBs or the set of precoded REs. The semi-open-loop MIMO transmission component 199 may be within one or more processors of one or more of the CU 1010, DU 1030, and the RU 1040. The semi-open-loop MIMO transmission component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1002 may include a variety of components configured for various functions. In one configuration, the network entity 1002 may include means for formulating, based on WB channel state information of a channel from a UE, a set of precoding matrices to be applied on a set of RBs or a set of REs for a data channel transmission on the channel. The network entity 1002 may further include means for precoding the set of RBs or the set of REs for the data channel transmission on the channel with the formulated set of precoding matrices and a set of phase values in a cycling manner. The network entity 1002 may further include means for transmitting, via the channel, an indication of the set of precoded RBs or the set of precoded REs.

In one configuration, the WB channel state information includes at least one of a set of selected beams, a strongest selected beam, or a set of amplitude values for the set of selected beams.

In another configuration, the network entity 1002 may further include means for transmitting, for the UE, a set of reference signals via the channel without precoding, and means for receiving, from the UE, the WB channel state information of the channel.

In another configuration, the network entity 1002 may further include means for transmitting, for the UE, an indication of the formulated set of precoding matrices or the set of phase values.

In another configuration, the network entity 1002 may further include means for selecting a number of DMRS ports and beams for a transmission of a DMRS based on the WB channel state information, and means for transmitting, via the channel, the DMRS based on the selected number of DMRS ports and beams without precoder cycling. In some implementations, the means for selecting the number of DMRS ports for the transmission of the DMRS based on the WB channel state information may include configuring the network entity 1002 to associate the WB channel state information with the transmission of the DMRS, and select the number of DMRS ports for the transmission of the DMRS based on the association of the WB channel state information with the transmission of the DMRS.

In another configuration, each precoding matrix in the set of precoding matrices may be associated with a different phase value in the set of phase values.

In another configuration, each precoding matrix in the set of precoding matrices may be applied to one or more RBs in the set of RBs or to one or more REs in the set of REs for the data channel transmission.

In another configuration, the set of RBs or the set of REs for the data channel transmission may be associated with a PDSCH.

In another configuration, the set of precoding matrices may be associated with at least one of a Type-II codebook or an enhanced Type-II codebook (eType-II codebook).

The means may be the semi-open-loop MIMO transmission component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

Figure 11:
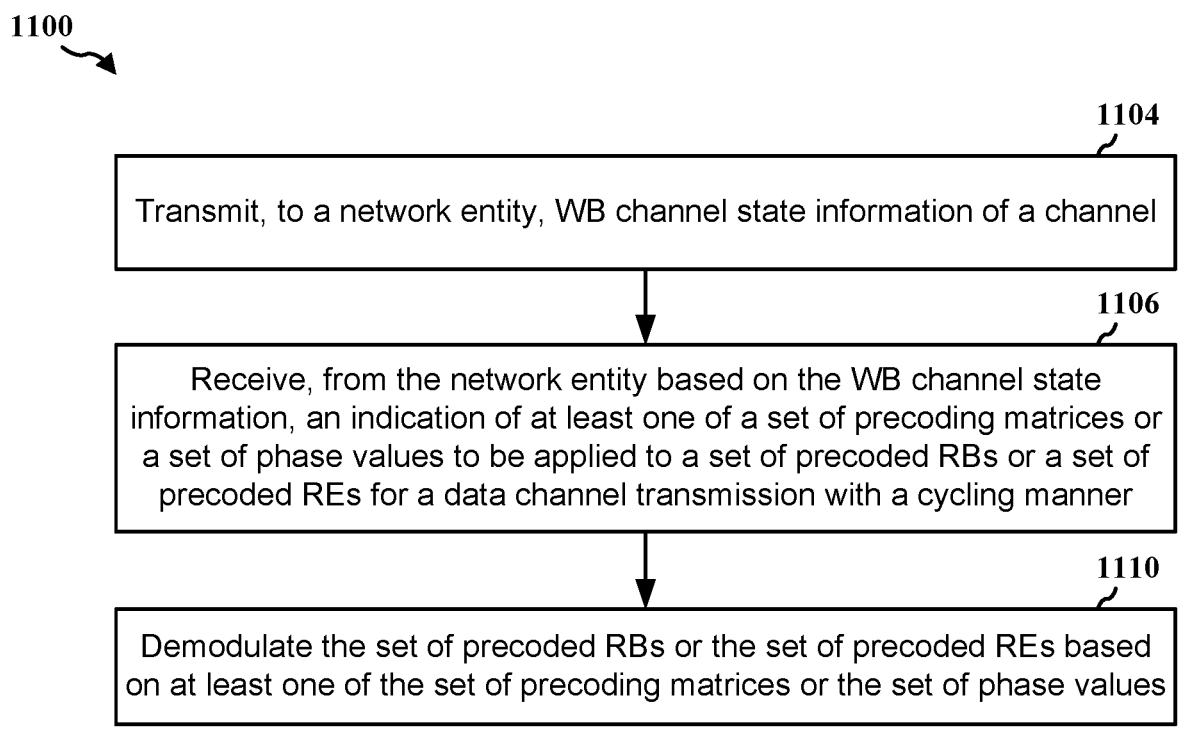
FIG. 11 is a flowchart of a method of wireless communication.

FIG. 11 is a flowchart 1100 of a method of wireless communication at a user equipment (UE). The method may be performed by a UE (e.g., the UE 104, 702; the apparatus 1304). The method may enable the UE to receive data transmission from the network based on a semi-open-loop MIMO scheme to reduce reporting overhead.

At 1104, the UE may transmit, to a network entity, WB channel state information of a channel, such as described in connection with FIG. 7. For example, at 714, the UE 702 may receive and measure the set of RSs, generate the corresponding WB CSI for the channel, and transmit the generated WB CSI to the network entity 704. The transmission of the WB channel state information may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In one example, the WB channel state information may include at least one of a set of selected beams, a strongest selected beam, or a set of amplitude values for the set of selected beams.

At 1106, the UE may receive, from the network entity based on the WB channel state information, an indication of at least one of a set of precoding matrices or a set of phase values to be applied to a set of precoded RBs or a set of precoded REs for a data channel transmission with a cycling manner, such as described in connection with FIG. 7. For example, at 722, the UE 702 may receive, from the network entity 704, an indication of the set of precoding matrices, the set of phase values, and/or the number of DMRS ports. The reception of the indication may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

At 1110, the UE may demodulate the set of precoded RBs or the set of precoded REs based on at least one of the set of precoding matrices or the set of phase values, such as described in connection with FIG. 7. For example, at 720, after the UE 702 receives the precoded set of RBs/REs (and the set of DMRS), the UE 702 may be configured to demodulate and decode the precoded set of RBs/REs based on the precoding matrix applied to the set of RBs/REs and based on the number of DMRS ports used by the network entity 704 for transmitting the DMRS. The demodulation of the set of precoded RBs or the set of precoded REs may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In one example, the UE may measure, for the network entity, a set of reference signals via the channel, and generate the WB channel state information of the channel based on the measurement, such as described in connection with FIG. 7. For example, at 712, the UE 702 may receive, from the network entity 704, a set of RSs via the channel. Then, as shown at 714, the UE 702 may measure the set of RSs, generate the corresponding WB CSI for the channel, and transmit the generated WB CSI to the network entity 704. The measurement of the set of reference signals and/or the generation of the WB channel state information may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In another example, the UE may determine a number of DMRS ports for a reception of a DMRS via the channel based on the indication of at least one of the set of precoding matrices or the set of phase values, and receive, via the channel, the DMRS based on the determined number of DMRS ports, such as described in connection with FIG. 7. For example, at 720, after the UE 702 receives the precoded set of RBs/REs (and the set of DMRS), the UE 702 may be configured to demodulate and decode the precoded set of RBs/REs based on the precoding matrix applied to the set of RBs/REs and based on the number of DMRS ports used by the network entity 704 for transmitting the DMRS. For example, the UE 702 may be configured to calculate the precoded channel by applying the (e)type-II precoding matrix:

$$Hw^{(r)} = \frac{1}{\sqrt{M_t \sum_{l=0}^{2L-1} |\alpha_l|^2}} \begin{bmatrix} \sum_{i=0}^{L-1} \alpha_i^{(1)} H_+ x_i \\ \sum_{i=0}^{L-1} \alpha_{i+L}^{(1)} H_- x_i \end{bmatrix}.$$

At 720, the UE 702 may also receive a set of DMRS based on the selected DMRS ports. The determination of the number of DMRS ports and/or the reception of the DMRS may be performed by, e.g., the semi-open-loop MIMO demodulation component 198, the transceiver(s) 1322, the cellular baseband processor(s) 1324, and/or the application processor(s) 1306 of the apparatus 1304 in FIG. 13. In some implementations, the number of DMRS ports for the reception of the DMRS may be further based on an association of the WB channel state information with the reception of the DMRS.

In another example, the UE may transmit an indication of the demodulated set of precoded RBs or the demodulated set of precoded REs based on at least one of the set of precoding matrices or the set of phase values, such as described in connection with FIG. 7. For example, in some implementations, the UE 702 may also be configured to transmit an indication of the demodulated set of precoded RBs/REs based on at least one of the set of precoding matrices or the set of phase values. The transmission of the indication may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In another example, each precoding matrix in the set of precoding matrices may be associated with a different phase value in the set of phase values.

In another example, each precoding matrix in the set of precoding matrices may be applied to one or more RBs in the set of RBs or to one or more REs in the set of REs for the data channel transmission.

In another example, the set of RBs or the set of REs for the data channel transmission may be associated with a PDSCH.

In another example, the set of precoding matrices may be associated with at least one of a Type-II codebook or an eType-II codebook.

Figure 12:
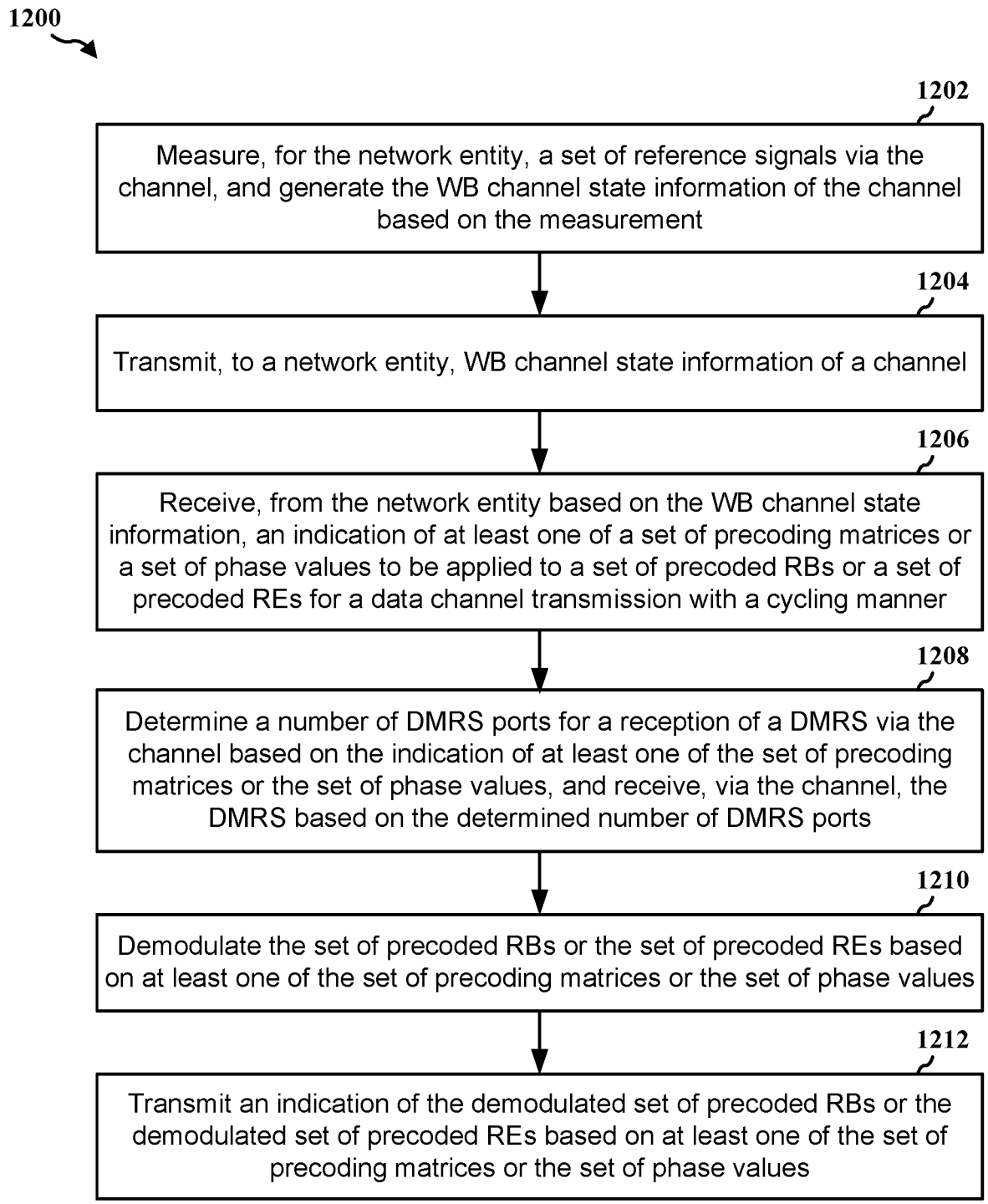
FIG. 12 is a flowchart of a method of wireless communication.

FIG. 12 is a flowchart 1200 of a method of wireless communication at a user equipment (UE). The method may be performed by a UE (e.g., the UE 104, 702; the apparatus 1304). The method may enable the UE to receive data transmission from the network based on a semi-open-loop MIMO scheme to reduce reporting overhead.

At 1204, the UE may transmit, to a network entity, WB channel state information of a channel, such as described in connection with FIG. 7. For example, at 714, the UE 702 may receive and measure the set of RSs, generate the corresponding WB CSI for the channel, and transmit the generated WB CSI to the network entity 704. The transmission of the WB channel state information may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In one example, the WB channel state information may include at least one of a set of selected beams, a strongest selected beam, or a set of amplitude values for the set of selected beams.

At 1206, the UE may receive, from the network entity based on the WB channel state information, an indication of at least one of a set of precoding matrices or a set of phase values to be applied to a set of precoded RBs or a set of precoded REs for a data channel transmission with a cycling manner, such as described in connection with FIG. 7. For example, at 722, the UE 702 may receive, from the network entity 704, an indication of the set of precoding matrices, the set of phase values, and/or the number of DMRS ports. The reception of the indication may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

At 1210, the UE may demodulate the set of precoded RBs or the set of precoded REs based on at least one of the set of precoding matrices or the set of phase values, such as described in connection with FIG. 7. For example, at 720, after the UE 702 receives the precoded set of RBs/REs (and the set of DMRS), the UE 702 may be configured to demodulate and decode the precoded set of RBs/REs based on the precoding matrix applied to the set of RBs/REs and based on the number of DMRS ports used by the network entity 704 for transmitting the DMRS. The demodulation of the set of precoded RBs or the set of precoded REs may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In one example, as shown at 1202, the UE may measure, for the network entity, a set of reference signals via the channel, and generate the WB channel state information of the channel based on the measurement, such as described in connection with FIG. 7. For example, at 712, the UE 702 may receive, from the network entity 704, a set of RSs via the channel. Then, as shown at 714, the UE 702 may measure the set of RSs, generate the corresponding WB CSI for the channel, and transmit the generated WB CSI to the network entity 704. The measurement of the set of reference signals and/or the generation of the WB channel state information may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In another example, as shown at 1208, the UE may determine a number of DMRS ports for a reception of a DMRS via the channel based on the indication of at least one of the set of precoding matrices or the set of phase values, and receive, via the channel, the DMRS based on the determined number of DMRS ports, such as described in connection with FIG. 7. For example, at 720, after the UE 702 receives the precoded set of RBs/REs (and the set of DMRS), the UE 702 may be configured to demodulate and decode the precoded set of RBs/REs based on the precoding matrix applied to the set of RBs/REs and based on the number of DMRS ports used by the network entity 704 for transmitting the DMRS. For example, the UE 702 may be configured to calculate the precoded channel by applying the (e)type-II precoding matrix:

$$Hw^{(r)} = \frac{1}{\sqrt{M_t \sum_{l=0}^{2L-1} |\alpha_l|^2}} \begin{bmatrix} \sum_{l=0}^{L-1} \alpha_l^{(1)} H_+ x_i \\ \sum_{l=0}^{L-1} \alpha_{l+L}^{(1)} H_- x_i \end{bmatrix}.$$

At 720, the UE 702 may also receive a set of DMRS based on the selected DMRS ports. The determination of the number of DMRS ports and/or the reception of the DMRS may be performed by, e.g., the semi-open-loop MIMO demodulation component 198, the transceiver(s) 1322, the cellular baseband processor(s) 1324, and/or the application processor(s) 1306 of the apparatus 1304 in FIG. 13. In some implementations, the number of DMRS ports for the reception of the DMRS may be further based on an association of the WB channel state information with the reception of the DMRS.

In another example, as shown at 1212, the UE may transmit an indication of the demodulated set of precoded RBs or the demodulated set of precoded REs based on at least one of the set of precoding matrices or the set of phase values, such as described in connection with FIG. 7. For example, in some implementations, the UE 702 may also be configured to transmit an indication of the demodulated set of precoded RBs/REs based on at least one of the set of precoding matrices or the set of phase values. The transmission of the indication may be performed by, e.g., the semi-open-loop MIMO demodulation component 198, the transceiver(s) 1322, the cellular baseband processor(s) 1324, and/or the application processor(s) 1306 of the apparatus 1304 in FIG. 13.

In another example, each precoding matrix in the set of precoding matrices may be associated with a different phase value in the set of phase values.

In another example, each precoding matrix in the set of precoding matrices may be applied to one or more RBs in the set of RBs or to one or more REs in the set of REs for the data channel transmission.

In another example, the set of RBs or the set of REs for the data channel transmission may be associated with a PDSCH.

In another example, the set of precoding matrices may be associated with at least one of a Type-II codebook or an eType-II codebook.

Figure 13:
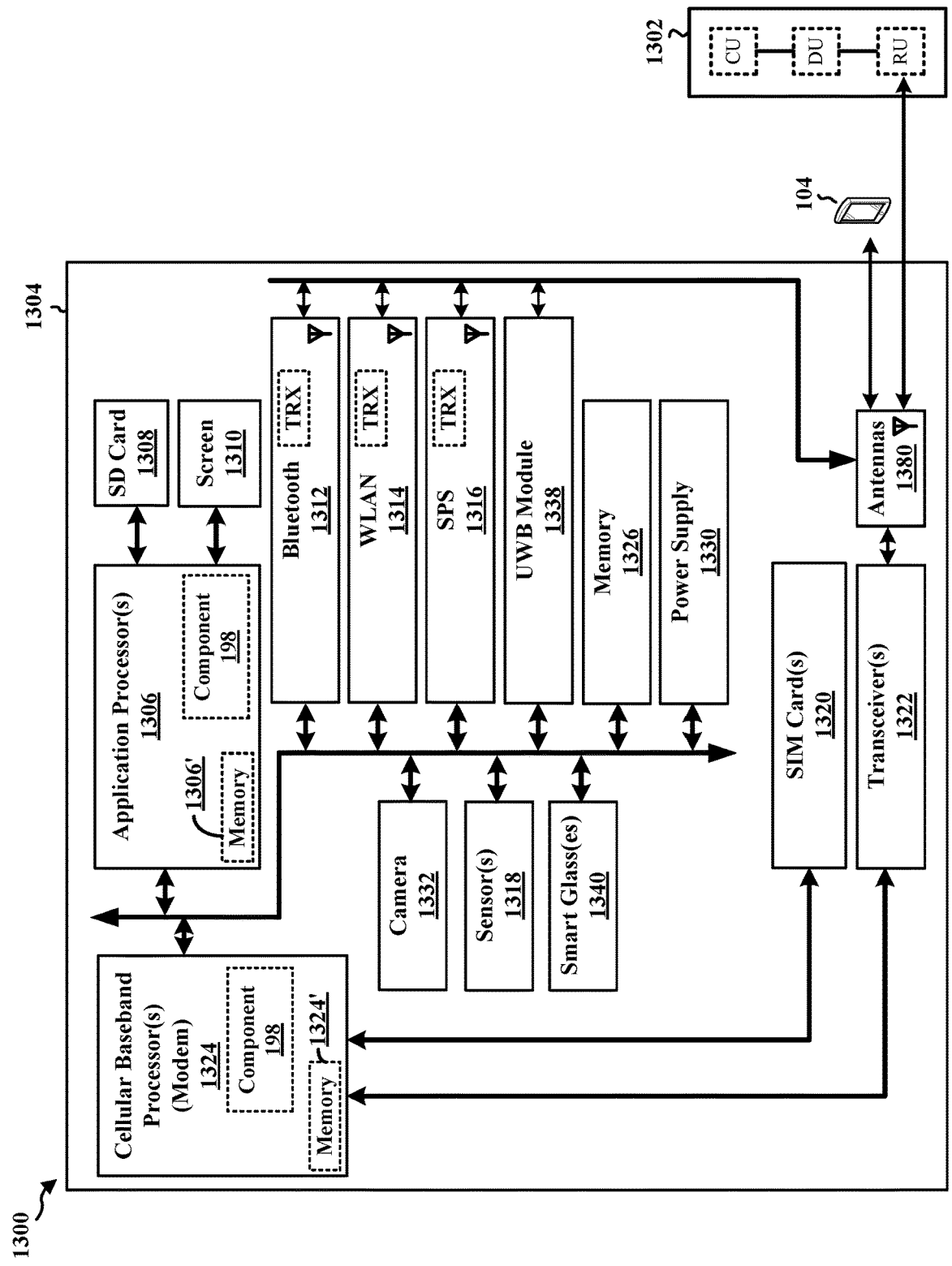
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an ultrawide band (UWB) module 1338, an SPS module 1316 (e.g., GNSS module), smart glass(es) 1340, one or more sensors 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the UWB module 1338, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the semi-open-loop MIMO demodulation component 198 may be configured to transmit, to a network entity, WB channel state information of a channel. The semi-open-loop MIMO demodulation component 198 may also be configured to receive, from the network entity based on the WB channel state information, an indication of at least one of a set of precoding matrices or a set of phase values to be applied to a set of precoded RBs or a set of precoded REs for a data channel transmission with a cycling manner. The semi-open-loop MIMO demodulation component 198 may also be configured to demodulate the set of precoded RBs or the set of precoded REs based on at least one of the set of precoding matrices or the set of phase values. The semi-open-loop MIMO demodulation component 198 may be within the cellular baseband processor(s) 1324, the application processor(s) 1306, or both the cellular baseband processor(s) 1324 and the application processor(s) 1306. The semi-open-loop MIMO demodulation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for transmitting, to a network entity, WB channel state information of a channel. The apparatus 1304 may further include means for receiving, from the network entity based on the WB channel state information, an indication of at least one of a set of precoding matrices or a set of phase values to be applied to a set of precoded RBs or a set of precoded REs for a data channel transmission with a cycling manner. The apparatus 1304 may further include means for demodulating the set of precoded RBs or the set of precoded REs based on at least one of the set of precoding matrices or the set of phase values.

In one configuration, the WB channel state information may include at least one of a set of selected beams, a strongest selected beam, or a set of amplitude values for the set of selected beams.

In one configuration, the apparatus 1304 may further include means for measuring, for the network entity, a set of reference signals via the channel, and means for generating the WB channel state information of the channel based on the measurement.

In another configuration, the apparatus 1304 may further include means for determining a number of DMRS ports for a reception of a DMRS via the channel based on the indication of at least one of the set of precoding matrices or the set of phase values, and means for receiving, via the channel, the DMRS based on the determined number of DMRS ports. In some implementations, the number of DMRS ports for the reception of the DMRS may be further based on an association of the WB channel state information with the reception of the DMRS.

In another configuration, the apparatus 1304 may further include means for transmitting an indication of the demodulated set of precoded RBs or the demodulated set of precoded REs based on at least one of the set of precoding matrices or the set of phase values.

In another configuration, each precoding matrix in the set of precoding matrices may be associated with a different phase value in the set of phase values.

In another configuration, each precoding matrix in the set of precoding matrices may be applied to one or more RBs in the set of RBs or to one or more REs in the set of REs for the data channel transmission.

In another configuration, the set of RBs or the set of REs for the data channel transmission may be associated with a PDSCH.

In another configuration, the set of precoding matrices may be associated with at least one of a Type-II codebook or an eType-II codebook.

The means may be the semi-open-loop MIMO demodulation component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising: formulating, based on wideband (WB) channel state information of a channel from a user equipment (UE), a set of precoding matrices to be applied on a set of resource blocks (RBs) or a set of resource elements (REs) for a data channel transmission on the channel; precoding the set of RBs or the set of REs for the data channel transmission on the channel with the formulated set of precoding matrices and a set of phase values in a cycling manner; and transmitting, via the channel, an indication of the set of precoded RBs or the set of precoded REs.

Aspect 2 is the method of aspect 1, wherein the WB channel state information includes at least one of a set of selected beams, a strongest selected beam, or a set of amplitude values for the set of selected beams.

Aspect 3 is the method of aspect 1 or aspect 2, further comprising: transmitting, for the UE, a set of reference signals via the channel without precoding; and receiving, from the UE, the WB channel state information of the channel.

Aspect 4 is the method of any of aspects 1 to 3, further comprising: transmitting, for the UE, an indication of the formulated set of precoding matrices or the set of phase values.

Aspect 5 is the method of any of aspects 1 to 4, further comprising: selecting a number of demodulation reference signal (DMRS) ports and beams for a transmission of a DMRS based on the WB channel state information; and transmitting, via the channel, the DMRS based on the selected number of DMRS ports and beams without precoder cycling.

Aspect 6 is the method of aspect 5, wherein selecting the number of DMRS ports for the transmission of the DMRS based on the WB channel state information comprises: associating the WB channel state information with the transmission of the DMRS; and selecting the number of DMRS ports for the transmission of the DMRS based on the association of the WB channel state information with the transmission of the DMRS.

Aspect 7 is the method of any of aspects 1 to 6, wherein each precoding matrix in the set of precoding matrices is associated with a different phase value in the set of phase values.

Aspect 8 is the method of any of aspects 1 to 7, wherein each precoding matrix in the set of precoding matrices is applied to one or more RBs in the set of RBs or to one or more REs in the set of REs for the data channel transmission.

Aspect 9 is the method of any of aspects 1 to 8, wherein the set of RBs or the set of REs for the data channel transmission is associated with a physical downlink shared channel (PDSCH).

Aspect 10 is the method of any of aspects 1 to 9, wherein the set of precoding matrices is associated with at least one of a Type-II codebook or an enhanced Type-II codebook (eType-II codebook).

Aspect 11 is an apparatus for wireless communication at a network entity, including: at least one memory; and at least one processor coupled to the at least one memory and, based at least in part on information stored in the at least one memory, the at least one processor, individually or in any combination, is configured to implement any of aspects 1 to 10.

Aspect 12 is the apparatus of aspect 11, further including at least one transceiver coupled to the at least one processor.

Aspect 13 is an apparatus for wireless communication at a network entity, including means for implementing any of aspects 1 to 10.

Aspect 14 is a computer-readable medium (e.g., a non-transitory computer-readable medium) storing computer executable code, where the code when executed by a processor causes the processor to implement any of aspects 1 to 10.

Aspect 15 is a method of wireless communication at a user equipment (UE), comprising: transmitting, to a network entity, wideband (WB) channel state information of a channel; receiving, from the network entity based on the WB channel state information, an indication of at least one of a set of precoding matrices or a set of phase values to be applied to a set of precoded resource blocks (RBs) or a set of precoded resource elements (REs) for a data channel transmission with a cycling manner; and demodulating the set of precoded RBs or the set of precoded REs based on at least one of the set of precoding matrices or the set of phase values.

Aspect 16 is the method of aspect 15, wherein the WB channel state information includes at least one of a set of selected beams, a strongest selected beam, or a set of amplitude values for the set of selected beams.

Aspect 17 is the method of aspect 15 or aspect 16, further comprising: measuring, for the network entity, a set of reference signals via the channel; and generating the WB channel state information of the channel based on the measurement.

Aspect 18 is the method of any of aspects 15 to 17, further comprising: determining a number of demodulation reference signal (DMRS) ports for a reception of a DMRS via the channel based on the indication of at least one of the set of precoding matrices or the set of phase values; and receiving, via the channel, the DMRS based on the determined number of DMRS ports.

Aspect 19 is the method of aspect 18, wherein the number of DMRS ports for the reception of the DMRS is further based on an association of the WB channel state information with the reception of the DMRS.

Aspect 20 is the method of any of aspects 15 to 19, further comprising: transmitting an indication of the demodulated set of precoded RBs or the demodulated set of precoded REs based on at least one of the set of precoding matrices or the set of phase values.

Aspect 21 is the method of any of aspects 15 to 20, wherein each precoding matrix in the set of precoding matrices is associated with a different phase value in the set of phase values.

Aspect 22 is the method of any of aspects 15 to 21, wherein each precoding matrix in the set of precoding matrices is applied to one or more RBs in the set of RBs or to one or more REs in the set of REs for the data channel transmission.

Aspect 23 is the method of any of aspects 15 to 22, wherein the set of RBs or the set of REs for the data channel transmission is associated with a physical downlink shared channel (PDSCH).

Aspect 24 is the method of any of aspects 15 to 23, wherein the set of precoding matrices is associated with at least one of a Type-II codebook or an enhanced Type-II codebook (eType-II codebook).

Aspect 25 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 24.

Aspect 26 is the apparatus of aspect 25, further including at least one transceiver coupled to the at least one processor.

Aspect 27 is an apparatus for wireless communication at a user equipment (UE), including means for implementing any of aspects 1 to 24.

Aspect 28 is a computer-readable medium (e.g., a non-transitory computer-readable medium) storing computer executable code, where the code when executed by a processor causes the processor to implement any of aspects 1 to 24.

What is claimed is:

1. An apparatus for wireless communication at a network entity, comprising:
at least one memory; and
at least one processor coupled to the at least one memory, the at least one processor, individually or in any combination, is configured to:
formulate, based on wideband (WB) channel state information of a channel from a user equipment (UE), a set of precoding matrices to be applied on a set of resource blocks (RBs) or a set of resource elements (REs) for a data channel transmission on the channel, wherein the set of precoding matrices is associated with at least one of a Type-II codebook or an enhanced Type-II codebook (eType-II codebook);
precode the set of RBs or the set of REs for the data channel transmission on the channel with the formulated set of precoding matrices and a set of phase values in a cycling manner; and
transmit, via the channel, an indication of the set of precoded RBs or the set of precoded REs.

2. The apparatus of claim 1, wherein the WB channel state information includes at least one of a set of selected beams, a strongest selected beam, or a set of amplitude values for the set of selected beams.

3. The apparatus of claim 1, wherein the at least one processor, individually or in any combination, is further configured to:
transmit, for the UE, a set of reference signals via the channel without precoding; and
receive, from the UE, the WB channel state information of the channel.

4. The apparatus of claim 1, wherein the at least one processor, individually or in any combination, is further configured to:
transmit, for the UE, an indication of the formulated set of precoding matrices or the set of phase values.

5. The apparatus of claim 1, wherein the at least one processor, individually or in any combination, is further configured to:
select a number of demodulation reference signal (DMRS) ports and beams for a transmission of a DMRS based on the WB channel state information; and
transmit, via the channel, the DMRS based on the selected number of DMRS ports and beams without precoder cycling.

6. The apparatus of claim 5, wherein to select the number of DMRS ports for the transmission of the DMRS based on the WB channel state information, the at least one processor, individually or in any combination, is configured to:
associate the WB channel state information with the transmission of the DMRS; and
select the number of DMRS ports for the transmission of the DMRS based on the association of the WB channel state information with the transmission of the DMRS.

7. The apparatus of claim 1, wherein each precoding matrix in the set of precoding matrices is associated with a different phase value in the set of phase values.

8. The apparatus of claim 1, wherein each precoding matrix in the set of precoding matrices is applied to one or more RBs in the set of RBs or to one or more REs in the set of REs for the data channel transmission.

9. The apparatus of claim 1, wherein the set of RBs or the set of REs for the data channel transmission is associated with a physical downlink shared channel (PDSCH).

10. A method of wireless communication at a network entity, comprising:
formulating, based on wideband (WB) channel state information of a channel from a user equipment (UE), a set of precoding matrices to be applied on a set of resource blocks (RBs) or a set of resource elements (REs) for a data channel transmission on the channel, wherein the set of precoding matrices is associated with at least one of a Type-II codebook or an enhanced Type-II codebook (eType-II codebook);
precoding the set of RBs or the set of REs for the data channel transmission on the channel with the formulated set of precoding matrices and a set of phase values in a cycling manner; and
transmitting, via the channel, an indication of the set of precoded RBs or the set of precoded REs.

11. The method of claim 10, wherein the WB channel state information includes at least one of a set of selected beams, a strongest selected beam, or a set of amplitude values for the set of selected beams.

12. The method of claim 10, further comprising:
transmitting, for the UE, a set of reference signals via the channel without precoding; and
receiving, from the UE, the WB channel state information of the channel.

13. The method of claim 10, further comprising:
transmitting, for the UE, an indication of the formulated set of precoding matrices or the set of phase values.

14. The method of claim 10, further comprising:
selecting a number of demodulation reference signal (DMRS) ports and beams for a transmission of a DMRS based on the WB channel state information; and
transmitting, via the channel, the DMRS based on the selected number of DMRS ports and beams without precoder cycling.

15. An apparatus for wireless communication at a user equipment (UE), comprising:
at least one memory; and
at least one processor coupled to the at least one memory, the at least one processor, individually or in any combination, is configured to:
transmit, to a network entity, wideband (WB) channel state information of a channel;
receive, from the network entity based on the WB channel state information, an indication of at least one of a set of precoding matrices or a set of phase values to be applied to a set of precoded resource blocks (RBs) or a set of precoded resource elements (REs) for a data channel transmission with a cycling manner, wherein the set of precoding matrices is associated with at least one of a Type-II codebook or an enhanced Type-II codebook (eType-II codebook); and
demodulate the set of precoded RBs or the set of precoded REs based on at least one of the set of precoding matrices or the set of phase values.

16. The apparatus of claim 15, wherein the WB channel state information includes at least one of a set of selected beams, a strongest selected beam, or a set of amplitude values for the set of selected beams.

17. The apparatus of claim 15, wherein the at least one processor, individually or in any combination, is further configured to:

measure, for the network entity, a set of reference signals via the channel; and generate the WB channel state information of the channel based on the measurement.

18. The apparatus of claim 15, wherein the at least one processor, individually or in any combination, is further configured to:

determine a number of demodulation reference signal (DMRS) ports for a reception of a DMRS via the channel based on the indication of at least one of the set of precoding matrices or the set of phase values; and receive, via the channel, the DMRS based on the determined number of DMRS ports.

19. The apparatus of claim 18, wherein the number of DMRS ports for the reception of the DMRS is further based on an association of the WB channel state information with the reception of the DMRS.

20. The apparatus of claim 15, wherein each precoding matrix in the set of precoding matrices is associated with a different phase value in the set of phase values.

21. The apparatus of claim 15, wherein each precoding matrix in the set of precoding matrices is applied to one or more RBs in the set of RBs or to one or more REs in the set of REs for the data channel transmission.

22. The apparatus of claim 15, wherein the set of RBs or the set of REs for the data channel transmission is associated with a physical downlink shared channel (PDSCH).

23. The apparatus of claim 15, wherein the at least one processor, individually or in any combination, is further configured to:

transmit an indication of the demodulated set of precoded RBs or the demodulated set of precoded REs based on at least one of the set of precoding matrices or the set of phase values.

24. A method of wireless communication at a user equipment (UE), comprising:

transmitting, to a network entity, wideband (WB) channel state information of a channel;

receiving, from the network entity based on the WB channel state information, an indication of at least one of a set of precoding matrices or a set of phase values to be applied to a set of precoded resource blocks (RBs) or a set of precoded resource elements (REs) for a data channel transmission with a cycling manner, wherein the set of precoding matrices is associated with at least one of a Type-II codebook or an enhanced Type-II codebook (eType-II codebook); and demodulating the set of precoded RBs or the set of precoded REs based on at least one of the set of precoding matrices or the set of phase values.

25. The method of claim 24, wherein the WB channel state information includes at least one of a set of selected beams, a strongest selected beam, or a set of amplitude values for the set of selected beams.

26. The method of claim 24, further comprising:

measuring, for the network entity, a set of non-precoded reference signals via the channel; and generating the WB channel state information of the channel based on the measurement.

27. The method of claim 24, further comprising:

determining a number of demodulation reference signal (DMRS) ports for a reception of a DMRS via the channel based on the indication of at least one of the set of precoding matrices or the set of phase values; and receiving, via the channel, the DMRS based on the determined number of DMRS ports.

28. The method of claim 27, wherein the number of DMRS ports for the reception of the DMRS is further based on an association of the WB channel state information with the reception of the DMRS.

* * * * *